(12) United States Patent
Makino

(10) Patent No.: US 11,489,197 B2
(45) Date of Patent: Nov. 1, 2022

(54) SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

(71) Applicant: FUJIFILM Corporation, Tokyo (JP)

(72) Inventor: Masaomi Makino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 290 days.

(21) Appl. No.: 16/820,648

(22) Filed: Mar. 16, 2020

(65) Prior Publication Data

US 2020/0220210 A1    Jul. 9, 2020

Related U.S. Application Data

(63) Continuation of application No. PCT/JP2018/032178, filed on Aug. 30, 2018.

(30) Foreign Application Priority Data

Sep. 28, 2017 (JP) .............................. JP2017-189047

(51) Int. Cl.
*H01M 10/0562* (2010.01)
*H01M 4/38* (2006.01)
(Continued)

(52) U.S. Cl.
CPC ....... *H01M 10/0562* (2013.01); *H01M 4/382* (2013.01); *H01M 10/058* (2013.01);
(Continued)

(58) Field of Classification Search
None
See application file for complete search history.

(56) References Cited

U.S. PATENT DOCUMENTS 9,240,583 B2    1/2016  Hidaka et al.
10,818,963 B2 *  10/2020  Makino ................ H01M 4/505
(Continued)

FOREIGN PATENT DOCUMENTS

CN       102232254       11/2011
JP       2016166258       9/2016
(Continued)

OTHER PUBLICATIONS

"Office Action of China Counterpart Application", dated Dec. 16, 2020, with English translation thereof, pp. 1-17.
(Continued)

*Primary Examiner* — Alix E Eggerding
(74) *Attorney, Agent, or Firm* — JCIPRNET

(57) ABSTRACT

A solid electrolyte composition containing an inorganic solid electrolyte having conductivity of an ion of a metal belonging to Group I or II of the periodic table and an acid-modified cellulose nanofiber, a solid electrolyte-containing sheet and a manufacturing method therefor, and an all-solid state secondary battery having an inorganic solid electrolyte layer containing the inorganic solid electrolyte having conductivity of an ion of a metal belonging to Group I or II of the periodic table and an acid-modified cellulose nanofiber and a manufacturing method therefor.

34 Claims, 1 Drawing Sheet

(51) Int. Cl.
    *H01M 10/0525*    (2010.01)
    *H01M 10/058*     (2010.01)
    *H01M 4/02*        (2006.01)

(52) U.S. Cl.
    CPC .. *H01M 10/0525* (2013.01); *H01M 2004/027* (2013.01); *H01M 2300/0068* (2013.01)

(56) References Cited

U.S. PATENT DOCUMENTS

| | | | |
|---|---|---|---|
| 2017/0250442 A1* | 8/2017 | Maranas | H01M 10/0565 |
| 2018/0083307 A1 | 3/2018 | Makino et al. | |

FOREIGN PATENT DOCUMENTS

| | | |
|---|---|---|
| JP | 2018156940 | 10/2018 |
| WO | 2016199805 | 12/2016 |

OTHER PUBLICATIONS

Hiroyuki Yano, "Cellulosic Nanofiber Materials", Wood Industry, Oct. 1, 2008, with brief English description, pp. 1-9.

"International Search Report (Form PCT/ISA/210) of PCT/JP2018/032178," dated Dec. 4, 2018, with English translation thereof, pp. 1-5.

"Written Opinion of the International Searching Authority (Form PCT/ISA/237) of PCT/JP2018/032178," dated Dec. 4, 2018, with English translation thereof, pp. 1-8.

* cited by examiner

SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

CROSS-REFERENCE TO RELATED APPLICATIONS

This application is a Continuation of PCT International Application No. PCT/JP2018/032178 filed on Aug. 30, 2018, which claims priority under 35 U.S.C. § 119 (a) to Japanese Patent Application No. 2017-189047 filed in Japan on Sep. 28, 2017. Each of the above applications is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, and methods for manufacturing a solid electrolyte-containing sheet and an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives.

Due to the respective advantages described above, research and development of all-solid state secondary batteries as next-generation lithium ion batteries and, furthermore, solid electrolyte compositions that are used for these all-solid state secondary batteries are underway. For example, WO2016/199805A proposes a solid electrolyte composition containing an inorganic solid electrolyte having ion conductivity of an ion of a metal belonging to Group I or II of the periodic table, a linear structure having an average diameter of 0.001 to 1 µm, an average length of 0.1 to 150 µm, a ratio of the average length to the average diameter of 10 to 100,000, and an electric conductivity of $1 \times 10^{-6}$ S/m or less, and an organic solvent.

SUMMARY OF THE INVENTION

In all-solid state secondary batteries, as described above, electrode active material layers configuring electrodes (a negative electrode and a positive electrode) and a solid electrolyte layer are formed of solid particles of active materials, an inorganic solid electrolyte, or the like.

In the case of repeatedly charging and discharging the above-described all-solid state secondary battery, the active materials repeatedly expand and contract, and the binding property between the solid particles is impaired. As a result, battery performance, particularly, battery voltage after the repetition of charging and discharging degrades, and a sufficient cycle characteristic is not exhibited. As described above, in all-solid state secondary batteries, the enhancement of the binding property between solid particles is important in terms of exhibiting an excellent cycle characteristic (a characteristic capable of maintaining battery performance in spite of the repetition of charging and discharging).

In lithium ion secondary batteries, during charging, electrons migrate from the positive electrode to the negative electrode, and, on the other hand, lithium ions are discharged from the positive electrode active material or the like configuring the positive electrode, pass through the electrolyte, reach the negative electrode, and are accumulated in the negative electrode. A phenomenon in which some of the lithium ions accumulated in the negative electrode as described above capture an electron and are precipitated as lithium metal occurs. In a case in which the precipitates of this lithium metal grow in a dendrite shape due to the repetition of charging and discharging, the precipitates soon reach the positive electrode, an internal short circuit is caused, and the lithium ion secondary batteries do not function as secondary batteries. As described above, in all-solid state secondary batteries, the blocking of dendrites from reaching the positive electrode is important in terms of suppressing the occurrence of a short circuit.

An object of the present invention is to provide a solid electrolyte composition which does not easily allow the occurrence of a short circuit and is capable of suppressing a decrease in battery voltage in an all-solid state secondary battery to be obtained by being used as a material configuring a solid electrolyte layer in the all-solid state secondary battery. In addition, another object of the present invention is to provide a solid electrolyte-containing sheet and an all-solid state secondary battery in which this solid electrolyte composition is used and methods for manufacturing the same.

As a result of repeating a variety of studies, the present inventors found that, in the case of using a solid electrolyte composition in which a solid electrolyte and an acid-modified cellulose nanofiber are used in combination as a material configuring a solid electrolyte layer, it is possible to realize an all-solid state secondary battery in which not only the occurrence of a short circuit but also a decrease in battery voltage are suppressed in spite of the repetition of charging and discharging. The present invention was completed by repeating additional studies on the basis of the above-described finding.

That is, the above-described objects have been achieved by the following means.

<1> A solid electrolyte composition comprising: an inorganic solid electrolyte (A) having conductivity of an ion of a metal belonging to Group I or II of the periodic table; and an acid-modified cellulose nanofiber (B).

<2> The solid electrolyte composition according to <1>, in which the acid-modified cellulose nanofiber (B) is an acid-modified substance of at least any of a carboxy group or a phosphoric acid group and a salt thereof.

<3> The solid electrolyte composition according to <1> or <2>, in which an acid value of the acid-modified cellulose nanofiber (B) is 0.1 to 2.5 mmol/g.

<4> The solid electrolyte composition according to any one of <1> to <3>, in which the acid-modified cellulose nanofiber (B) has an average fiber diameter of 1 to 1,000 nm and an average fiber length of 10 to 100,000 nm.

<5> The solid electrolyte composition according to any one of <1> to <4>, in which a mass ratio (A)/(B) of a content of the inorganic solid electrolyte (A) to a content of the acid-modified cellulose nanofiber (B) is 99.9/0.1 to 50/50.

<6> The solid electrolyte composition according to any one of <1> to <5>, in which a water content is 50 ppm or less.

<7> The solid electrolyte composition according to any one of <1> to <6>, in which the inorganic solid electrolyte (A) is a sulfide-based inorganic solid electrolyte.

<8> The solid electrolyte composition according to any one of <1> to <7>, further comprising: a non-aqueous dispersion medium (C).

<9> The solid electrolyte composition according to any one of <1> to <8>, in which the non-aqueous dispersion medium (C) is a hydrocarbon compound solvent, an ether compound solvent, a ketone compound solvent, an ester compound solvent, or a combination of two or more thereof.

<10> The solid electrolyte composition according to any one of <1> to <9>, further comprising: a binder (D).

<11> The solid electrolyte composition according to any one of <1> to <10>, in which the binder (D) includes a polymer having a basic functional group.

<12> The solid electrolyte composition according to any one of <1> to <11>, further comprising: an active material (E).

<13> The solid electrolyte composition according to any one of <1> to <12>, further comprising: a conductive auxiliary agent (F).

<14> A solid electrolyte-containing sheet comprising: an inorganic solid electrolyte (A) having conductivity of an ion of a metal belonging to Group I or II of the periodic table; and an acid-modified cellulose nanofiber (B).

<15> A method for manufacturing a solid electrolyte-containing sheet comprising: a step of forming a film of the solid electrolyte composition according to any one of <1> to <13>.

<16> An all-solid state secondary battery comprising: a positive electrode active material layer; a negative electrode active material layer; and an inorganic solid electrolyte layer between the positive electrode active material layer and the negative electrode active material layer, in which the inorganic solid electrolyte layer contains an inorganic solid electrolyte (A) having conductivity of an ion of a metal belonging to Group I or II of the periodic table and an acid-modified cellulose nanofiber (B).

<17> The all-solid state secondary battery according to <16>, in which the inorganic solid electrolyte layer has a thickness of 1 to 30 μm.

<18> The all-solid state secondary battery according to <16> or <17>, in which the negative electrode active material layer is a layer of lithium metal.

<19> A method for manufacturing an all-solid state secondary battery, in which the all-solid state secondary battery is manufactured through the manufacturing method according to <15>.

The solid electrolyte composition and the solid electrolyte-containing sheet of the present invention are capable of suppressing both the occurrence of a short circuit and a decrease in battery voltage in an all-solid state secondary battery by being respectively used as a material configuring a solid electrolyte layer of the all-solid state secondary battery or the solid electrolyte layer. In addition, the all-solid state secondary battery of the present invention does not easily allow the occurrence of a short circuit and is capable of suppressing a decrease in battery voltage. Furthermore, the methods for manufacturing a solid electrolyte-containing sheet and an all-solid state secondary battery of the present invention are capable of manufacturing a solid electrolyte-containing sheet and an all-solid state secondary battery which have the above-described excellent characteristics.

The above-described and other characteristics and advantages of the present invention will be further clarified by the following description with reference to appropriately accompanied drawings.

DESCRIPTION OF THE PREFERRED EMBODIMENTS

Figure 1:
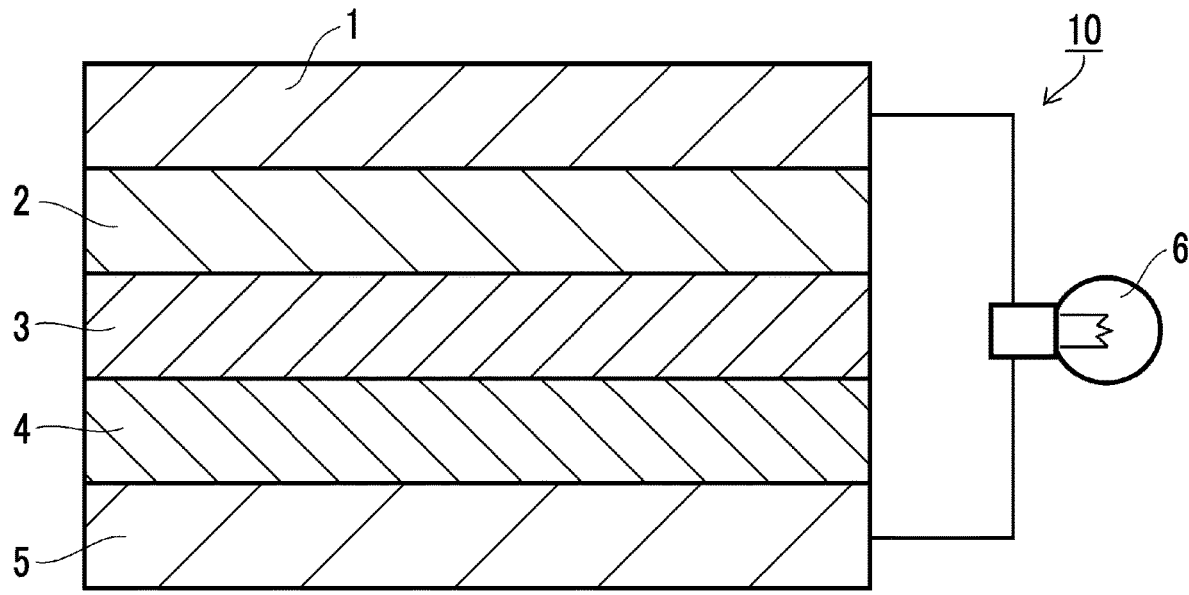
FIG. 1 is a vertical cross-sectional view schematically illustrating an all-solid state secondary battery according to a preferred embodiment of the present invention.

In the description of the present invention, numerical ranges expressed using "to" include numerical values before and after the "to" as the lower limit value and the upper limit value.

[Solid Electrolyte Composition]

A solid electrolyte composition of an embodiment of the present invention contains an inorganic solid electrolyte (A) having conductivity of an ion of a metal belonging to Group I or II of the periodic table and an acid-modified cellulose nanofiber (B). This solid electrolyte composition contains the acid-modified cellulose nanofiber (B) as an organic substance; however, generally, a substance that serves as the base of the solid electrolyte composition is the inorganic solid electrolyte (A), and thus, in the present invention, the solid electrolyte composition will be referred to as the inorganic solid electrolyte composition in some cases.

In the solid electrolyte composition of the embodiment of the present invention, the aspect of the acid-modified cellulose nanofiber (B) present (contained) in the composition is not particularly limited as long as the acid-modified cellulose nanofiber coexists with the inorganic solid electrolyte (A).

For example, the mixing aspect of the inorganic solid electrolyte (A) and the acid-modified cellulose nanofiber (B) is generally an aspect in which both substances are uniformly mixed together; however, in the present invention, an aspect in which the acid-modified cellulose nanofibers (B) are unevenly present or dispersed in the inorganic solid electrolyte (A) is also regarded as the mixing aspect.

In addition, in the solid electrolyte composition of the embodiment of the present invention, an aspect in which, when at least a solid electrolyte-containing sheet described below or an inorganic solid electrolyte layer is formed, the acid-modified cellulose nanofiber (B) is present in voids or interfaces between the solid particles of the inorganic solid electrolyte (A) or the like is preferred. Even in the case of repeatedly charging and discharging an all-solid state secondary battery including a solid electrolyte layer made from the solid electrolyte composition employing this aspect, it is possible to effectively suppress a decrease in battery voltage and, furthermore, also suppress the occurrence of a short circuit.

Furthermore, in the solid electrolyte composition of the embodiment of the present invention, each of the acid-modified cellulose nanofibers (B) may be present singly, but the acid-modified cellulose nanofibers have a small diameter and are fine, and thus an aspect in which the acid-modified cellulose nanofibers aggregate or gather together to form an entangled cellulose porous fiber film (including a cellulose porous fiber mass) is preferred. This cellulose porous fiber film is considered to form a dense (three-dimensional) network. Even in the case of repeatedly charging and discharging an all-solid state secondary battery including a solid electrolyte layer made from the solid electrolyte composition employing this aspect, it is possible to effectively suppress the occurrence of a short circuit and, furthermore, also suppress a decrease in battery voltage.

Furthermore, the solid electrolyte composition of the embodiment of the present invention also includes, in addition to an aspect of a simple mixture of the inorganic solid electrolyte (A) and the acid-modified cellulose nanofiber (B), an aspect containing a complex (integrated substance) of the inorganic solid electrolyte (A) and the acid-modified cellulose nanofiber (B). This complex is considered to be formed by the interaction between acid groups that the acid-modified cellulose nanofibers (B) have and the solid particles of the inorganic solid electrolyte or the like. As such an interaction, adsorption (including chemical adsorption and physical adsorption), a chemical reaction (for example, a hydrogen bond, an ionic bond by an acid and a base, a covalent bond, or π-π stacking), and the like are exemplified. As the complex, an aspect in which the acid-modified cellulose nanofibers (B) form the cellulose porous fiber film and this film is incorporated (into voids or interfaces) between the inorganic solid electrolyte (A) portions, an aspect in which the cellulose porous fiber film coats or surrounds the inorganic solid electrolyte (A), an aspect in which these aspects coexist, or the like is exemplified. Even in the case of repeatedly charging and discharging an all-solid state secondary battery including a solid electrolyte layer made from the solid electrolyte composition containing this complex, it is possible to effectively suppress both the occurrence of a short circuit and a decrease in battery voltage.

The water content (also referred to as the content of moisture) of the solid electrolyte composition of the embodiment of the present invention is preferably 50 ppm or less, more preferably 20 ppm or less, still more preferably 10 ppm or less, and particularly preferably 5 ppm or less. In a case in which the water content of the solid electrolyte composition is small, it is possible to suppress the deterioration of the inorganic solid electrolyte (A). A water content indicates the amount of water contained in the solid electrolyte composition (the mass proportion in the solid electrolyte composition) and is specifically regarded as a value measured using a method described in examples below.

Hereinafter, the components that the solid electrolyte composition of the embodiment of the present invention contains and containable components will be described.

<Inorganic Solid Electrolyte (A)>

In the present invention, the inorganic solid electrolyte is an inorganic solid electrolyte, and the solid electrolyte refers to a solid-form electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the inorganic solid electrolyte is a solid in a static state and thus, generally, is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has conductivity of an ion of a metal belonging to Group I or II of the periodic table and is generally a substance not having electron conductivity.

In the present invention, the inorganic solid electrolyte has conductivity of an ion of a metal belonging to Group I or II of the periodic table. As the inorganic solid electrolyte, it is possible to appropriately select and use solid electrolyte materials that are applied to this kind of products. As the inorganic solid electrolyte, (i) sulfide-based inorganic solid electrolytes and (ii) oxide-based inorganic solid electrolytes are exemplified as typical examples, and, from the viewpoint of a high ion conductivity and easiness in joining interfaces between particles, sulfide-based inorganic solid electrolytes are preferred.

In a case in which an all-solid state secondary battery of the embodiment of the present invention is an all-solid state lithium ion secondary battery, the inorganic solid electrolyte preferably has ion conductivity of lithium ions.

(i) Sulfide-Based Inorganic Solid Electrolytes

Sulfide-based inorganic solid electrolytes are preferably compounds which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

As the sulfide-based inorganic solid electrolyte, for example, lithium ion-conductive sulfide-based inorganic solid electrolyte satisfying a composition represented by Formula (I) are exemplified.

$$L_{a1}M_{b1}P_{c1}S_{d1}A_{e1} \qquad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphoruspentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, $SnS$, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include Li2S—P2S5, Li2S—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$-LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method for synthesizing sulfide-based inorganic solid electrolyte materials using the above-described raw material compositions include an amorphorization method. Examples of the amorphorization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably compounds which contain oxygen atoms (O), have an ion conductivity of metals belonging to Group I or II of the periodic table, and have electron-insulating properties. The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited, but realistically $1\times10^{-1}$ S/cm or less.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{mb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2e)}M^{cc}_{xe}D^{cc}O$ (xe represents a number of 0 or more and 0.1 or less, and $M^{cc}$ represents a divalent metal atom. $D^{cc}$ represents a halogen atom or a combination of two or more halogen atoms.), $Li_{xf}Si_{yf}O_{zf}$ (1≤xf≤5, 0<yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

The inorganic solid electrolyte preferably has a particle form. In this case, the volume-average particle diameter of the inorganic solid electrolyte is not particularly limited, but is preferably 0.01 µm or more and more preferably 0.1 µm or more. The upper limit is preferably 100 µm or less and more preferably 50 µm or less. The average particle diameter of the inorganic solid electrolyte particles is measured in the following order. The inorganic solid electrolyte particles are diluted and prepared to one percent by mass of a dispersion liquid by using water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a quartz cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

The inorganic solid electrolyte may be used singly or two or more inorganic solid electrolytes may be used in combination.

In a case in which a decrease in the interface resistance and the maintenance of the decreased interface resistance in the case of being used in the all-solid state secondary battery are taken into account, the content of the inorganic solid electrolyte in the solid electrolyte composition is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

Here, in a case in which the solid electrolyte composition contains an active material described below, regarding the content of the inorganic solid electrolyte in the solid electrolyte composition, the total content of the active material and the inorganic solid electrolyte is preferably in the above-described range.

In the present invention, the solid content (solid component) refers to a component that does not volatilize or evaporate and thus disappear in a case where the solid electrolyte composition is subjected to a drying treatment at 80° C. for six hours under a nitrogen atmosphere at a pressure of 1 mmHg. Typically, the solid component refers to a component other than a non-aqueous dispersion medium described below.

<Acid-Modified Cellulose Nanofiber (B)>

The solid electrolyte composition of the embodiment of the present invention contains acid-modified cellulose nanofiber (B).

In the case of forming a solid electrolyte-containing sheet or a solid electrolyte layer using this solid electrolyte composition, the cellulose porous fiber film is formed, and, preferably, the complex is formed. Therefore, the acid-modified cellulose nanofiber (B) functions as a binder for the solid particles, and it is possible to more strongly adhere or bind the solid particles. In addition, it is possible to block dendrites that have grown along the voids or interfaces from reaching the positive electrode without impairing the circulation of ions of metals belonging to Group I or II of the periodic table.

Particularly, the acid-modified cellulose nanofiber (B) has an acid group. Therefore, in a case in which the acid-modified cellulose nanofibers are used in layers configuring an all-solid state secondary battery, it is possible to more effectively suppress the occurrence of a short circuit and a decrease in battery voltage against cellulose nanofibers that are not acid-modified and are mechanically dispersed. The reason therefor is not yet clear, but is considered as follows: The acid-modified cellulose nanofiber (B) has an excellent affinity to the surface of the solid particle of the solid electrolyte or the like and is capable of more strongly bonding the solid particles, which enhances the effect for suppressing the occurrence of a short circuit. In addition, the acid-modified cellulose nanofiber (B) is capable of strongly bonding the solid electrolyte particles as described above and is capable of decreasing resistance by increasing the ion conductivity of the interfaces. Therefore, it is possible to effectively decrease battery voltage.

Furthermore, as described below, in a case in which the solid electrolyte composition contains the acid-modified cellulose nanofiber (B), it is possible to suppress the occurrence of a short circuit and a decrease in voltage, furthermore, the thickness reduction of the solid electrolyte layer and/or the application of a lithium metal layer as a negative electrode active material layer are enabled, and it is possible to manufacture a high-capacity all-solid state secondary battery.

The acid-modified cellulose nanofiber (B) that is used in the present invention is a cellulose nanofiber that has been acid-modified. More specifically, the acid-modified cellulose nanofiber refers to a so-called cellulose nanofiber (also expressed as CNF) which is a microfibril of cellulose configuring the basic skeleton or the like of a plant cell wall or a fiber configuring the cellulose (cellulose fiber) and has an average fiber diameter (width) of approximately 100 nm or less and in which an acid group is introduced to the glucose skeleton of the surface of the cellulose microfibril.

As the above-described cellulose fiber, plant-derived fibers included in wood, bamboo, hemp, jute, kenaf, cotton, pulp, agricultural waste, cloth, paper, or the like are exemplified, and one kind of fiber described above may be used singly or two or more kinds of fibers may be jointly used.

As the wood, for example, Sitka Spruce, Cedar, Cypress, Eucalyptus, Acacia, and the like are exemplified. As the paper, for example, deinked waste paper, cardboard waste paper, magazines, copy paper, and the like are exemplified.

As the pulp, for example, chemical pulp (craft pulp (KP) or sulfite pulp (SP)), semi-chemical pulp (SCP), semi-ground pulp (CGP), chemi-mechanical pulp (CMP), groundwood pulp (GP), refiner mechanical pulp (RMP), thermomechanical pulp (TMP), chemi-thermomechanical pulp (CTMP), and the like which are obtained by producing pulp using a plant raw material chemically or/and mechanically are exemplified.

An acid (acid group) that modifies (is introduced to) the cellulose nanofiber is not particularly limited, and a carboxy group, a phosphoric acid group, or a salt thereof is exemplified. In the present invention, the acid-modified cellulose nanofiber (B) is preferably an acid-modified substance of at least any of a carboxy group, a phosphoric acid group, and a salts thereof of the cellulose nanofiber.

The salt of a carboxy group or a phosphoric acid group is not particularly limited, and, for example, a metal salt (preferably an alkali metal salt), an (organic) ammonium salt, and the like are exemplified.

As the above-described acid-modified cellulose nanofiber (B), for example, a nanofiber having a carboxy group (—C(=O)OH group) that is a oxidized carbon atom having a hydroxyl group in a microfibril, a nanofiber having a hydroxyl group of a microfibril and a phosphoric acid group (—OP(=O)(OR)$_2$: R represents a hydrogen atom or a substituent) with which a phosphoric acid compound has reacted, a nanofiber having a salt thereof, a nanofiber having a combination thereof, and the like are exemplified.

The position to which the acid group is introduced is not particularly limited and may be any of a second site, a third side, and a sixth side in the glucose skeleton forming the basic skeleton of the cellulose nanofiber or may be a combination of two or more sites. For example, the sixth site is preferred. The degree of substitution (the amount introduced) by the acid group is not particularly limited; however, in a case in which the degree of substitution is regarded as 3 when all of the hydroxyl groups in the glucose skeleton are substituted, the degree of substitution is preferably 0.1 to 3, more preferably 0.2 to 2.8, and still more preferably 0.5 to 2.5.

The average fiber diameter of the acid-modified cellulose nanofibers is not particularly limited as long as the average fiber diameter is in nanometer order, but is preferably 1 to 1,000 nm, more preferably 1 to 300 nm, and still more preferably 1 to 100 nm. In addition, the average fiber length is not particularly limited, but is preferably 10 to 100,000 nm, more preferably 10 to 50,000 nm, and still more preferably 10 to 10,000 nm. In a case in which at least one of the average fiber diameter or the average fiber length is in the above-described preferred range, the formation of a dense cellulose porous fiber film becomes easy when the solid electrolyte-containing sheet is produced. The ratio of the average fiber length to the average fiber diameter (aspect ratio) is not particularly limited, but is, for example, preferably 2 to 1,000, more preferably 5 to 500, and still more preferably 10 to 200.

The average fiber diameter and the average fiber length can be confirmed and computed using a scanning electron microscope (SEM) and an atomic force microscope (AFM). Specific measurement methods will be described in examples.

The acid value of the acid-modified cellulose nanofiber is not particularly limited as long as the acid-modified cellulose nanofiber is acid-modified. The acid value of the acid-modified cellulose nanofiber is preferably 0.1 to 2.5 mmol/g, more preferably 0.2 to 2.5 mmol/g, and still more preferably 0.5 to 2.5 mmol/g. In a case in which this acid value is in the above-described preferred range, the adhesive force to the solid particles of the inorganic solid electrolyte or the like and, furthermore, a binder (D) having a basic functional group described below becomes strong.

The acid value of the cellulose nanofiber can be measured using a conductivity titration method in which a fine cellulose fiber-containing slurry is prepared, a protonation treatment is carried out thereon using an ion exchange resin, and then a change in electric conductivity is obtained while adding a sodium hydroxide aqueous solution thereto. A specific measurement method will be described in the examples.

Generally, in order to untangle a cellulose fiber to nanofibers, two methods exemplified below are known. A first one is cellulose nanofibers obtained by carrying out a chemical treatment (acid modification) and then a defibration treatment on a cellulose fiber (chemically modified cellulose nanofibers), and a second one is cellulose nanofibers obtained by carrying out only a physical or mechanical defibration treatment on a cellulose fiber (non-chemically modified cellulose nanofibers).

The acid-modified cellulose nanofibers (B) that are used in the present invention need to include at least chemically modified cellulose nanofibers and may be a mixture of chemically modified cellulose nanofibers and non-chemically modified cellulose nanofibers.

The chemically modified cellulose nanofiber can be uniformly refined to several nanometers in width, and the acid group is introduced to the cellulose fiber by a chemical treatment, and thus the interaction with an active material, the inorganic solid electrolyte, a collector, or the like becomes strong, the binding property is strong in the case of producing a sheet of the inorganic solid electrolyte, and flexibility is also excellent. In addition, generally, a dense cellulose porous fiber film can be obtained from a dried substance of fine cellulose nanofibers, and thus the penetration of lithium dendrites can be suppressed, and it becomes possible to prevent a short circuit. Furthermore, the formation of the cellulose porous fiber film also enables improvement in the strength of the solid electrolyte-containing sheet.

As the chemical treatment that is carried out on the cellulose fiber, well-known acid modification treatment methods such as an oxidation treatment, a phosphoric acid esterification treatment, an enzyme treatment, and an ozone treatment can be used singly or two or more methods can be used in combination. Among them, an oxidation method in which an N-oxyl compound is used or a phosphoric acid esterification method in which a compound having a phosphoric acid group and urea are used is preferred since a reaction is possible in a water system under mild conditions, and the acid-modified cellulose nanofiber can be obtained with a light mechanical dispersion treatment while maintaining the crystal structure of the cellulose fiber.

(Oxidation Method in Which N-oxyl Compound is Used)

The oxidation treatment method in which an N-oxyl compound is used is, for example, a chemical treatment for selectively oxidizing the hydroxyl group at the sixth site in the glucose skeleton of the surface of a cellulose microfibril using a co-oxidant in the presence of 2,2,6,6-tetramethyl-1-piperidine-N-oxyl (TEMPO) or a derivative thereof. Generally, a carbon atom having a hydroxyl group is oxidized to turn into a —C(=O)OH group or a salt thereof.

As the oxidation method in which an N-oxyl compound is used, for example, methods described in JP2013-010891A, JP2012-021081A, JP2012-214717A JP2010-235687A, and the like are exemplified.

(Phosphoric Acid Esterification Method)

The phosphoric acid esterification method is a chemical treatment for introducing a phosphoric acid group into a hydroxyl group of a cellulose fiber by causing a compound having a phosphoric acid group (or a salt thereof) to interact with a fiber raw material including a cellulose fiber in the presence of urea (or a derivative thereof). Generally, the hydroxyl group is modified to a phosphoric acid group (—OP(=O)(OH)$_2$) or a salt thereof. In the phosphoric acid esterification method, the hydroxyl group in any of the second site, the third site, and the sixth site in the glucose skeleton is also modified.

As the phosphoric acid esterification method in which a compound having a phosphoric acid group and urea are used, for example, methods described in JP2017-025468A, WO2014-185505A, and the like are exemplified.

The defibration treatment after chemical modification is not particularly limited, and ordinary defibration methods in which a juicer mixer, a Henschel mixer, a high-speed mixer, a shear mixer, a ribbon blender, a homomixer, a homogenizer, a high-pressure homogenizer, an ultrahigh-pressure homogenizer, an ultrasonic homogenizer, a ball mill, a sand mill, a planetary mill, three rolls, a grinder, an attritor, a basket mill, or the like is used are exemplified.

(Usage Pattern of Acid-Modified Cellulose Nanofiber)

The acid-modified cellulose nanofibers are preferably dispersed in a non-aqueous solvent through solvent substitution by carrying out the chemical modification treatment and the defibration treatment in an aqueous solvent. The non-aqueous solvent is not particularly limited as long as the water content is 50 ppm or less. These acid-modified cellulose nanofibers are preferably used as a dispersion in which the nanofibers are dispersed in a concentration of 0.01% to 10% by mass from the viewpoint of easiness in handling.

The dispersion of the acid-modified cellulose nanofibers obtained as described above is not particularly limited as long as the water content of the solid electrolyte composition can be set in the above-described range, but the water content is preferably in the same range as the water content of the non-aqueous solvent.

—Dispersant of Acid-Modified Cellulose Nanofiber—

In order to uniformly disperse the acid-modified cellulose nanofibers (acid-modified CNFs) in the non-aqueous solvent, the surfaces thereof are preferably modified by a dispersant.

Here, the surfaces can be modified by forming a chemical bond with the surface and also can be modified by chemical or physical interaction (an electrostatic attractive force, a hydrogen bond, adsorption, or the like) with a molecule or the surface.

As such a dispersant, a compound having a functional group capable of interacting with a surface acid group of the cellulose nanofiber is preferred, and, for example, compounds having a hydroxy group, a carboxy group, an amino group, a nitrile group, or the like are exemplified. The dispersant is preferably a compound that is soluble in the non-aqueous solvent.

From the viewpoint of suppressing the aggregation of the acid-modified CNFs, the dispersant is preferably a compound having a long-chain alkyl group, a long-chain alkylene group, a long-chain ether group, or the like.

The dispersant of the acid-modified CNFs is preferably a polymer, and the weight-average molecular weight thereof is preferably 1,000 or more and less than 100,000. The weight-average molecular weight of the dispersant can be measured in the same manner as the binder (D) described below.

The polymer that is the dispersant of the acid-modified CNFs may be identical to or different from the binder (D) described below, and it is also possible to use polymers in an appropriate combination. In a case in which the dispersant of the acid-modified CNFs is identical to the binder (D), this dispersant is classified into the binder (D).

The amount of the dispersant of the acid-modified CNFs used is not particularly limited as long as the acid-modified CNFs can be dispersed, and the amount can be set to, for example, 0 to 20 parts by mass with respect to 100 parts by mass of the acid-modified CNFs.

One kind of the acid-modified CNFs may be used singly or two or more kinds thereof may be used in combination.

The content of the acid-modified CNFs in the solid electrolyte composition is preferably 0.1% by mass or more, more preferably 0.2% by mass or more, and particularly preferably 0.5% by mass or more with respect to 100% by mass of the solid component from the viewpoint of the formation of the cellulose porous fiber film (the suppression of the occurrence of a short circuit, the suppression of a decrease in battery voltage, and, furthermore, improvement in the binding property of a solid flow). From the same viewpoint, the upper limit is preferably 25% by mass or less, more preferably 20% by mass or less, still more preferably 10% by mass or less, and particularly preferably 5% by mass or less.

In the solid electrolyte composition, the mass ratio ((A)/(B)) of the content of the inorganic solid electrolyte (A) to the content of the acid-modified CNFs (B) is preferably 99.9/0.1 to 50/50, more preferably 99.8/0.2 to 80/20, and still more preferably 99.5/0.5 to 90/10.

<Non-Aqueous Dispersion Medium (C)>

The solid electrolyte composition of the embodiment of the present invention preferably contains a non-aqueous dispersion medium (C). In a case in which the solid electrolyte composition contains the non-aqueous dispersion medium (C), it is possible to prevent the decomposition and deterioration of the inorganic solid electrolyte. In addition, in a case in which the inorganic solid electrolyte (A) and the acid-modified cellulose nanofiber (B) are uniformly mixed together, and the solid electrolyte-containing sheet described below or the inorganic solid electrolyte layer is produced, it is possible to form the above-described cellulose porous fiber film and, furthermore, the complex.

In the present invention, the solid electrolyte composition containing the non-aqueous dispersion medium (C) includes, in addition to an aspect in which the solid electrolyte composition contains only the non-aqueous dispersion medium (C) (does not contain any aqueous dispersion medium), an aspect in which an aqueous dispersion medium is contained. However, in the aspect in which an aqueous dispersion medium is contained, a water content in the solid electrolyte composition does not exceed the above-described range.

In the present invention, the non-aqueous dispersion medium generally refers to a non-aqueous dispersion medium other than water, but may be a non-aqueous dispersion medium containing water (a mixed dispersion of water and a non-aqueous dispersion medium) as long as the water content in the solid electrolyte composition is small enough to satisfy the above-described range.

Such a non-aqueous dispersion medium needs to disperse the respective components that are included in the solid electrolyte composition of the embodiment of the present invention, and, for example, a variety of organic solvents are exemplified. As an organic solvent that can be used as the non-aqueous dispersion medium, an alcohol compound solvent, an ether compound solvent, an amide compound solvent, an amino compound solvent, a ketone compound solvent, an aromatic compound solvent, an aliphatic compound solvent, a nitrile compound solvent, an ester compound solvent, and the like are exemplified. Among these, a hydrocarbon compound solvent (the aromatic compound solvent and the aliphatic compound solvent), the ether compound solvent, the ketone compound solvent, or the ester compound solvent is preferred.

Examples of the alcohol compound solvent include methyl alcohol, ethyl alcohol, 1-propyl alcohol, 2-propyl alcohol, 2-butanol, ethylene glycol, propylene glycol, 1,6-hexanediol, cyclohexane diol, 1,3-butanediol, and 1,4-butanediol.

As the ether compound solvent, alkylene glycols (triethylene glycol and the like), alkylene glycol monoalkyl ethers (ethylene glycol monomethyl ether and the like), alkylene glycol dialkyl ethers (ethylene glycol dimethyl ether and the like), dialkyl ethers (diisopropyl ether, dibutyl ether, and the like), cyclic ethers (tetrahydrofuran, dioxane (including each of 1,2-, 1,3-, and 1,4- isomers), and the like) are exemplified.

Examples of the amide compound solvent include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphorictriamide, and the like.

Examples of the amino compound solvent include triethylamine, diisopropylethylamine, tributylamine, and the like.

Examples of the ketone compound solvent include acetone, methyl ethyl ketone, methyl isobutyl ketone, cyclopentanone, cyclohexanone, cycloheptanone, dipropyl ketone, dibutyl ketone, diisopropyl ketone, diisobutyl ketone, isobutyl propyl ketone, sec-butyl propyl ketone, pentyl propyl ketone, and butyl propyl ketone.

Examples of the aromatic compound solvent include benzene, toluene, and xylene.

Examples of the aliphatic compound solvent include hexane, heptane, octane, decane, cyclohexane, cyclooctane, paraffin, gasoline, naphtha, kerosene, and light oil.

Examples of the nitrile compound solvent include acetonitrile, propionitrile, isobutyronitrile, and the like.

Examples of the ester compound solvent include ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

The number of the non-aqueous dispersion media (C) contained in the solid electrolyte composition may be one or two or more, but is preferably two or more.

In a case in which the solid electrolyte composition of the embodiment of the present invention contains two or more non-aqueous dispersion media, a combination of two or more non-aqueous dispersion media selected from the group consisting of the hydrocarbon compound solvent, the ether compound solvent, the ketone compound solvent, and the ester compound solvent is preferred.

The content of the non-aqueous dispersion medium in the solid electrolyte composition is not particularly limited, but is preferably 20% to 80% by mass, more preferably 30% to 70% by mass, and particularly preferably 40% to 60% by mass.

<Binder (D)>

The solid electrolyte composition of the embodiment of the present invention preferably contains the binder (D). This binder (D) is capable of reinforcing the binding property between the solid particles of the inorganic solid electrolyte (A) or the like. On the other hand, in a case in which the binder (D) fills voids between the solid particles, there is a case in which the circulation of ions of metals belonging to Group I or II of the periodic table is blocked. Therefore, generally, the content of the binder (D) is set in consideration of the balance between the binding property and the ion conductivity, and there is a case in which it is not possible to fill voids between the solid particles. Therefore, there is a case in which it is not possible to satisfy both the binding property and the ion conductivity on a high level. However, in a case in which the acid-modified cellulose nanofiber (B) and the binder (D) are jointly used, as described above, the acid-modified cellulose nanofiber (B) does not impair the circulation of ions of metals belonging to Group I or II of the periodic table, and thus the acid-modified cellulose nanofiber intrudes into or enters voids or interfaces between the solid particles together with the binder (D) and is capable of further enhancing the binding property between the solid particles while ensuring a circulation path of the ions. Furthermore, both the acid-modified cellulose nanofiber (B) and the binder (D) are capable of blocking the growth of dendrites and are also capable of suppressing the occurrence of a short circuit.

The binder (D) is not particularly limited as long as the binder is a binder polymer that is generally used in solid electrolyte compositions for an all-solid state secondary battery. As the binder, preferably, binders made from a (meth)acrylic polymer, a urethane polymer, a urea polymer, an amide polymer, an imide polymer, an ester polymer, hydrocarbon rubber, fluoro-rubber, or the like are preferably exemplified.

The (meth)acrylic polymer is not particularly limited as long as the (meth)acrylic polymer is a polymer formed of a (meth)acrylic monomer, and, for example, polymethyl (meth)acrylate, poly(meth)acrylic acid, polyhydroxymethyl (meth)acrylate, and the like are exemplified. In addition, a polymer described in JP2015-088486A is also preferably exemplified.

As the urethane polymer, the urea polymer, the amide polymer, the imide polymer, and the ester polymer, polymers described in JP2015-088480A are respectively preferably exemplified.

As the hydrocarbon rubber, natural rubber, polybutadiene, polyisoprene, polystyrene butadiene, and hydrogenated polymers thereof are exemplified.

The fluoro-rubber preferably has a repeating unit derived from vinylidene fluoride, and, as such a polymer, polyvinylidene difluoride, polyvinylidene difluoride hexafluoropropylene, and the like are exemplified.

The number of the polymers forming the binder may be one or two or more.

The binder (D) preferably includes a polymer having a basic functional group. In a case in which the polymer forming the binder (D) has a basic functional group, the binder (D) and the acid-modified CNFs (B) causes an acid-base reaction (interaction) and are capable of more strongly binding the solid particles.

The basic functional group that the polymer forming the binder (D) has is not particularly limited as long as the basic functional group is a group capable of causing an acid-base reaction with an acid of the acid-modified cellulose nanofiber (B). In the present invention, the basic functional group refers to a group in which the pKa of a conjugate acid corresponding to the basic functional group is 2 or more and less than 14. As such a group, for example, substituted or unsubstituted amino group, amidino group (a group of an amidino compound), and the like are exemplified. The amino group may be any of primary to tertiary amino groups and may be a cyclic amino group. In addition, the amino group may be an aliphatic amino group or an aromatic amino group. Specifically, groups having the following compound as a partial structure are exemplified. As such a group, groups formed by removing at least one hydrogen atom from the following compound (for example, a dimethylamino group relative to dimethylamine), groups having this group and a linking group for combining this group into a binder (for example, a dimethyl aminoalkyl group), and the like are exemplified.

—Compound—

Dimethylamine, diethylamine, triethylamine, methyldiethylamine, butyldiethylamine, piperidine, morpholine, pyridine, imidazoline, imidazole, and diazabicycloundecene The basic functional group in the binder (D) may be combined into the main chain or may be combined into a side chain or a graft chain.

The binder (D) preferably includes a polymer having at least one group of a hydroxy group, a carboxy group, a sulfo group, a phosphoric acid group, an amino group, or a nitrile group. In a case in which the polymer forming the binder (D) has these groups, the binder is capable of enhancing the binding property by interacting with the solid particles of the inorganic solid electrolyte, an active material, the conductive auxiliary agent, or the like.

The binder (D) is preferably polymer particles. In this case, the average particle diameter of the polymer particles is preferably 0.01 to 10 μm and more preferably 0.01 to 1 μm. The average particle diameter of the polymer particles is a volume-average particle diameter measured in the same manner as the average particle diameter of the above-described inorganic solid electrolyte particles.

The average particle diameter can be measured from a produced all-solid state secondary battery by, for example, disassembling the battery, peeling an electrode, measuring the particle diameters of an electrode material thereof, and excluding the measurement values of the average particle diameters of particles other than the polymer particle which have been measured in advance.

As the polymer particles, commercially available polymer particles may be used, and polymer particles described in JP2016-139511A can be preferably used.

The weight-average molecular weight of the binder (D), particularly, the above-described preferred polymer is preferably 2,000 or more, more preferably 5,000 or more, and still more preferably 10,000 or more. The upper limit is preferably 1,000,000 or less, more preferably 200,000 or less, and still more preferably 100,000 or less.

In the present invention, unless particularly otherwise described, the weight-average molecular weight of the binder refers to a standard polystyrene-converted weight-average molecular weight measured by gel permeation chromatography (GPC). Regarding a measurement method therefor, basically, a value measured using a method under the following conditions A or conditions B (preferred) is used. An appropriate eluent may be appropriately selected and used depending on the kind of the binder polymer.

(Conditions A)

Column: Two TOSOH TSKgel Super AWM-H's (trade name) are connected together.

Carrier: 10 mMLiBr/N-methyl pyrrolidone

Measurement temperature: 40° C.

Carrier flow rate: 1.0 mL/min

Specimen concentration: 0.1% by mass

Detector: Refractive index (RI) detector
(Conditions B) Preferred
Column: A column obtained by connecting TOSOH TSKgel Super HZM-H (trade name), TOSOH TSKgel Super HZ4000 (trade name), and TOSOH TSKgel Super HZ2000 (trade name) is used.
Carrier: Tetrahydrofuran
Measurement temperature: 40° C.
Carrier flow rate: 1.0 mL/min
Specimen concentration: 0.1% by mass
Detector: Refractive index (RI) detector The content of the binder (D) in the solid electrolyte composition is preferably 0.01% by mass or more, more preferably 0.1% by mass or more, and still more preferably 1% by mass or more in 100% by mass of the solid component from the viewpoint of satisfying both the binding property with solid particles and the ion conductivity. From the viewpoint of battery characteristics, the upper limit is preferably 20% by mass or less, more preferably 10% by mass or less, and still more preferably 5% by mass or less.

In the solid electrolyte composition of the embodiment of the present invention, the mass ratio [(the mass of the inorganic solid electrolyte+the mass of the active material)/(the mass of the binder (B))] of the total mass (total amount) of the inorganic solid electrolyte (A) and the active material to the mass of the binder (B) is preferably in a range of 1,000 to 1. This ratio is preferably 500 to 2 and still more preferably 400 to 10.

The binder (D) may be used singly or two or more binders may be used in combination.

<Active Material (E)>

The solid electrolyte composition of the embodiment of the present invention may also contain an active material (E) capable of intercalating and deintercalating ions of metal elements belonging to Group I or II of the periodic table.

As the active material, a positive electrode active material and a negative electrode active material are exemplified, and a metal oxide (preferably a transition metal oxide) that is the positive electrode active material, a metal oxide that is the negative electrode active material, or metal capable of forming an alloy with lithium such as Sn, Si, Al, and In is preferred.

In the present invention, the solid electrolyte composition containing the active material (a positive electrode active material or a negative electrode active material) will be referred to as a composition for an electrode (a composition for a positive electrode or a composition for a negative electrode).

(Positive Electrode Active Material)

A positive electrode active material that the solid electrolyte composition of the embodiment of the present invention may contain is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxides having a bedded salt-type structure (MA) is preferred, and LCO or NMC is more preferred.

The shape of the positive electrode active material is not particularly limited, but is preferably a particle shape. The volume-average particle diameter (sphere-converted average particle diameter) of positive electrode active material particles is not particularly limited. For example, the volume-average particle diameter can be set to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (sphere-converted average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming a positive electrode active material layer, the mass (mg) of the positive electrode active material per unit area (cm$^2$) of the positive electrode active material layer (weight per unit area) is not particularly limited and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 55% to 80% by mass with respect to a solid content of 100% by mass.

(Negative Electrode Active Material)

A positive electrode active material that the solid electrolyte composition of the embodiment of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery driving duration can be extended.

The shape of the negative electrode active material is not particularly limited, but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to appropriately carry out wet-type crushing in which water or an organic solvent such as methanol is made to coexist. In order to provide a desired particle diameter, classification is preferably carried out. The classification method is not particularly limited, and it is possible to appropriately use a sieve, a wind power classifier, or the like. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass and more preferably 20% to 80% by mass with respect to a solid content of 100% by mass.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

<Conductive Auxiliary Agent (F)>

The solid electrolyte composition of the embodiment of the present invention may also contain a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, these conductive auxiliary agents may be used singly or two or more conductive auxiliary agents may be used.

In the present invention, in a case in which the active material and a conductive auxiliary agent are jointly used, among the above-described conductive auxiliary agents, a conductive auxiliary agent that does not intercalate and deintercalated an ion of a metal belonging to Group I or Group II of the periodic table and does not function as an active material at the time of charging and discharging a battery is regarded as the conductive auxiliary agent. Therefore, among the conductive auxiliary agents, a conductive auxiliary agent capable of functioning as the active material in the active material layer at the time of charging and discharging a battery is classified not into the conductive auxiliary agent but into the active material. Whether or not the conductive auxiliary agent functions as the active material at the time of charging and discharging a battery is not unambiguously determined but is determined by the combination with the active material.

The content of the conductive auxiliary agent in the solid electrolyte composition is preferably 0% to 5% by mass and more preferably 0.5% to 3% by mass with respect to 100 parts by mass of the solid content.

<Dispersant>

The solid electrolyte composition of the embodiment of the present invention may also contain a dispersant. It is possible to suppress the aggregation of the inorganic solid electrolyte or the like and form a uniform active material layer and a uniform solid electrolyte layer. As the dispersant, a dispersant that is generally used for an all-solid state secondary battery can be appropriately selected and used. Generally, a compound intended for particle adsorption and steric repulsion and/or electrostatic repulsion is preferably used.

<Lithium Salt>

The solid electrolyte composition of the embodiment of the present invention may also contain a lithium salt.

The lithium salt is not particularly limited, and, for example, the lithium salt described in Paragraphs 0082 to 0085 of JP2015-088486A is preferred. The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

<Ionic Liquid>

The solid electrolyte composition of the embodiment of the present invention may contain an ionic liquid in order to further improve the ion conductivity. The ionic liquid is not particularly limited, but is preferably an ionic liquid dissolving the above-described lithium salt from the viewpoint of effectively improving the ion conductivity. Examples thereof include compounds made of a combination of a cation and an anion described below.

(i) Cation

As the cation, an imidazolium cation, a pyridinium cation, a piperidinium cation, a pyrrolidinium cation, a morpholinium cation, a phosphonium cation, a quaternary ammonium cation, and the like are exemplified. Here, these cations have a substituent described below.

As the cation, these cations may be used singly or two or more cations can be used in combination.

A quaternary ammonium cation, a piperidinium cation, or a pyrrolidinium cation is preferred.

As the substituent that the cation has, an alkyl group (preferably having 1 to 8 carbon atoms and more preferably having 1 to 4 carbon atoms), a hydroxyalkyl group (preferably having 1 to 3 carbon atoms), an alkyloxyalkyl group (an alkyloxyalkyl group having 2 to 8 carbon atoms is preferred, and an alkyloxyalkyl group having 2 to 4 carbon atoms is more preferred), an ether group, an allyl group, an aminoalkyl group (an aminoalkyl group having 1 to 8 carbon atoms is preferred, and an aminoalkyl group having 1 to 4 carbon atoms is preferred), and an aryl group (an aryl group having 6 to 12 carbon atoms is preferred, and an aryl group having 6 to 8 carbon atoms is more preferred) are exemplified. The substituent may form a cyclic structure in a form of containing a cation site. The substituent may further have a substituent described in the section of the non-aqueous dispersion medium. The ether group can be used in combination with other substituents. As such a substituent, an alkyloxy group, an aryloxy group, and the like are exemplified.

(ii) Anion

As the anion, a chloride ion, a bromide ion, an iodide ion, a boron tetrafluoride ion, a nitric acid ion, a dicyanamide ion, an acetate ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate ion, a trifluoromethanesulfonate ion, and the like are exemplified.

As the anion, these anions may be used singly or two or more anions may also be used in combination.

A boron tetrafluoride ion, a bis(trifluoromethanesulfonyl)imide ion, a bis(fluorosulfonyl)imide ion, a hexafluorophosphate ion, a dicyanamide ion, or an allylsulfonate ion is preferred, and a bis(trifluoromethanesulfonyl)imide ion, a bis(fluorosulfonyl)imide ion, or an allylsulfonate ion is more preferred.

As the ionic liquid, for example, 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, 1-ethyl-3-methylimidazolium bis(trifluoromethanesulfonyl)imide, 1-ethyl-3-methylimidazolium bis(fluorosulfonyl)imide, 1-ethyl-3-methylimidazolium dicyanamide, 1-butyl-1-methylpyrrolidinium bis(trifluoromethanesulfonyl)imide, trimethylbutylammoniumbis(trifluoromethanesulfonyl)imide, N,N-diethyl-N-methyl-N-(2-methoxyethyl) ammonium bis (trifluoromethanesulfonyl)imide (DEME), N-propyl-N-methylpyrrolidiniumbis(trifluoromethanesulfonyl)imide (PMP), N-(2-methoxyethyl)-N-methylpyrrolidiniumtetrafluoroboride, 1-butyl-1-methylpyrrolidinium bis(fluorosulfonyl)imide, (2-acryloylethyl) trimethylammoniumbis (trifluoromethanesulfonyl)imide, 1-ethyl-1-methylpyrrolidinium allyl sulfonate, 1-ethyl-3-methylimidazolium allylsulfonate, and trihexyltetradecylphosphonium chloride are exemplified.

The content of the ionic liquid in the inorganic solid electrolyte is preferably 0 parts by mass or more, more preferably 1 part by mass or more, and most preferably 2 parts by mass or more with respect to 100 parts by mass of the solid content. The upper limit is preferably 50 parts by mass or less, more preferably 20 parts by mass or less, and particularly preferably 10 parts by mass or less.

The mass ratio between the lithium salt and the ionic liquid (the lithium salt:the ionic liquid) is preferably 1:20 to 20:1, more preferably 1:10 to 10:1, and still more preferably 1:7 to 2:1.

<Other Additives>

The solid electrolyte composition of the embodiment of the present invention is capable of containing, as components other than the respective components described above, as desired, a viscosity improver, a crosslinking agent (an agent causing a crosslinking reaction by radical polymerization, condensation polymerization, or ring-opening polymerization), a polymerization initiator (an agent that generates an acid or a radical by heat or light), a defoamer, a leveling agent, a dehydration agent, an antioxidant, and the like.

[Method for Manufacturing Solid Electrolyte Composition]

The solid electrolyte composition of the embodiment of the present invention can be prepared by mixing the inorganic solid electrolyte (A), the acid-modified cellulose nanofiber (B), and, as long as the action effect of the present invention is not impaired, the above-described components using a variety of mixers preferably in the presence of the non-aqueous dispersion medium (C).

In a case in which a water-based dispersion of the acid-modified cellulose nanofibers is used as the acid-modified cellulose nanofiber (B), first, a non-aqueous dispersion thereof is preferably prepared by solvent substitution or the like. A method for solvent substitution is not particularly limited, and an ordinary method can be applied. For example, the acid-modified cellulose nanofiber (B) is phase-separated from the water-based dispersion by an appropriate treatment or under appropriate conditions (by appropriately precipitating or gelating the acid-modified cellulose nanofiber). The phase-separated water-based non-aqueous dispersion medium is substituted into a desired non-aqueous dispersant. Therefore, a non-aqueous dispersion is obtained. More specifically, a solvent substitution method carried out in examples can be referred to.

The solid electrolyte composition of the embodiment of the present invention is preferably prepared as a slurry by dispersing the inorganic solid electrolyte (A), the acid-modified cellulose nanofiber (B), and, as desired, other components in the non-aqueous dispersion medium (C).

The slurry of the solid electrolyte composition can be prepared by mixing the respective components described above using a variety of mixers. The mixer is not particularly limited, and examples thereof include a ball mill, a beads mill, a planetary mixer, a blade mixer, a roll mill, a kneader, and a disc mill. The mixing conditions are not particularly limited; however, in the case of using a ball mill, the inorganic solid electrolyte and the dispersion medium are preferably mixed together at 150 to 700 rpm (rotation per minute) for 1 to 24 hours.

The binder (D) may be mixed during the mixing of the inorganic solid electrolyte (A) and the non-aqueous dispersion medium (C) or may be separately mixed. In addition, in the case of preparing a solid electrolyte composition containing the components such as the active material (E) and the non-aqueous dispersion medium, the binder may be mixed during the mixing of the inorganic solid electrolyte (A) and the non-aqueous dispersion medium (C) or may be separately mixed.

The inorganic solid electrolyte composition of the embodiment of the present invention is preferably used as a material forming the layers configuring the all-solid state secondary battery of the embodiment of the present invention or the solid electrolyte-containing sheet.

[Solid Electrolyte-Containing Sheet]

A solid electrolyte-containing sheet of the embodiment of the present invention is a sheet-shaped compact, contains the inorganic solid electrolyte (A) having conductivity of an ion of a metal belonging to Group I or II of the periodic table and the acid-modified cellulose nanofiber (B), and appropriately contains the other components described above as long as the action effect of the present invention is not impaired. This solid electrolyte-containing sheet has the solid electrolyte layer containing the inorganic solid electrolyte (A) and the acid-modified cellulose nanofiber (B) and may have other members such as the base material and a peeling sheet. The contents of the respective components in the solid electrolyte-containing sheet (solid electrolyte layer) of the embodiment of the present invention are not particularly limited, but are preferably identical to the contents of the respective components in the solid content of the solid electrolyte composition of the embodiment of the present invention. The solid electrolyte-containing sheet of the embodiment of the present invention is preferably formed of the solid electrolyte composition of the embodiment of the present invention.

As long as the solid electrolyte-containing sheet of the embodiment of the present invention contains the inorganic solid electrolyte (A) and the acid-modified cellulose nanofiber (B), the aspect of the above-described components present (contained) in the solid electrolyte-containing sheet is not particularly limited, and it is possible to employ the respective aspects described in the section of the solid electrolyte composition of the embodiment of the present invention. Preferably, the acid-modified cellulose nanofiber (B) forms the cellulose porous fiber film and, furthermore, forms the complex with the inorganic solid electrolyte (A).

The solid electrolyte-containing sheet of the embodiment of the present invention is capable of suppressing both the occurrence of a short circuit and a decrease in battery voltage in an all-solid state secondary battery by being used as a material configuring the solid electrolyte layer of the all-solid state secondary battery or the solid electrolyte layer. Furthermore, the solid electrolyte-containing sheet of the embodiment of the present invention exhibits a high strength since the binding force between the solid particles is strong.

This solid electrolyte-containing sheet can be preferably used in all-solid state secondary batteries and is modified in a variety of aspects depending on the uses. Examples thereof include a sheet that is preferably used in a solid electrolyte layer (also referred to as a solid electrolyte-containing sheet for an all-solid state secondary battery), a sheet that is preferably used in an electrode or a laminate of an electrode and a solid electrolyte layer (an electrode sheet for an all-solid state secondary battery), and the like. In the present invention, a variety of sheets described above will be collectively referred to as a sheet for an all-solid state secondary battery in some cases.

The sheet for an all-solid state secondary battery needs to be a sheet having a solid electrolyte layer or an active material layer (electrode layer) and may be a sheet having a solid electrolyte layer or an active material layer (electrode layer) formed on a base material or a sheet formed of a solid electrolyte layer or an active material layer (electrode layer) without having a base material.

This sheet for an all-solid state secondary battery may further have other layers as long as the sheet has the base material and the solid electrolyte layer or the active material layer, but a sheet containing an active material layer is classified into an electrode sheet for an all-solid state secondary battery described below. Examples of other layers include a protective layer (peeling sheet), a collector, a coating layer, and the like.

The base material is not particularly limited as long as the base material is capable of supporting the solid electrolyte layer or the active material layer, and examples thereof include sheet bodies (plate-like bodies) of materials, organic materials, inorganic materials, and the like described in the section of a collector to be described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The layer thickness of the solid electrolyte layer in the sheet for an all-solid state secondary battery is identical to the layer thickness of the solid electrolyte layer described in the section of an all-solid state secondary battery of the embodiment of the present invention.

Examples of the solid electrolyte-containing sheet for an all-solid state secondary battery include a sheet having the solid electrolyte layer and a protective layer on the base material in this order and a sheet made of the solid electrolyte layer (a sheet not having the base material).

An electrode sheet for an all-solid state secondary battery of the embodiment of the present invention (also simply referred to as "the electrode sheet") is a sheet that is preferably used to form the active material layer or a laminate of the solid electrolyte layer and the active material layer in the all-solid state secondary battery of the embodiment of the present invention and is an electrode sheet having at least the active material layer preferably as a collector on a metal foil. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The layer thicknesses of the respective layers constituting the electrode sheet are identical to the layer thicknesses of individual layers described in the section of an all-solid state secondary battery of the embodiment of the present invention.

[Manufacturing of Solid Electrolyte-Containing Sheet]

A method for manufacturing a solid electrolyte-containing sheet of the embodiment of the present invention is not particularly limited, and, for example, a method in which a film of the solid electrolyte composition of the embodiment of the present invention is formed (applied and dried) on a base material (possibly, through another layer), thereby forming a solid electrolyte layer or an active material layer (an applied and dried layer) on the base material is exemplified. Therefore, it is possible to produce a solid electrolyte-containing sheet having a base material and an applied and dried layer. Here, the applied and dried layer refers to a layer formed by applying the solid electrolyte composition of the embodiment of the present invention and drying the non-aqueous dispersion medium (that is, a layer formed using the solid electrolyte composition of the embodiment of the present invention and made of a composition obtained by removing the non-aqueous dispersion medium from the solid electrolyte composition of the embodiment of the present invention).

Individual steps for application, drying, or the like in the method for manufacturing a solid electrolyte-containing sheet of the embodiment of the present invention will be described in the following section of a method for manufacturing an all-solid state secondary battery.

The acid-modified cellulose nanofibers (B) have a small diameter and are fine and are thus likely to aggregate or gather to form an entangled cellulose porous fiber film in the case of applying and drying the solid electrolyte composition. The use of this property or the like enables the formation of the cellulose porous fiber film of the acid-modified cellulose nanofibers (B) in voids or interfaces in the solid electrolyte by applying and drying the solid electrolyte composition. Furthermore, it is possible to form the cellulose porous fiber film in voids or interfaces in the solid electrolyte as desired by adjusting the application and drying conditions, the content of the acid-modified cellulose nanofibers (B) in the solid electrolyte composition, or the like.

In the method for manufacturing a solid electrolyte-containing sheet of the embodiment of the present invention, it is also possible to pressurize the applied and dried layer obtained as described above. Pressurization conditions or the like will be described in the following section of the method for manufacturing an all-solid state secondary battery.

In addition, in the method for manufacturing a solid electrolyte-containing sheet of the embodiment of the present invention, it is also possible to peel the base material, a protective layer (particularly, a peeling sheet), or the like.

[All-Solid State Secondary Battery]

The all-solid state secondary battery of the embodiment of the present invention has a positive electrode active material layer, a negative electrode active material layer opposite to the positive electrode active material layer, and a solid electrolyte layer disposed between the positive electrode active material layer and the negative electrode active material layer. This solid electrolyte layer contains the inorganic solid electrolyte (A) having conductivity of an ion of a metal belonging to Group I or II of the periodic table and the acid-modified cellulose nanofiber (B). Furthermore, in the solid electrolyte layer, the acid-modified cellulose nanofibers (B) form the cellulose porous fiber film and, furthermore, form the complex with the inorganic solid electrolyte (A). Therefore, as described above, the all-solid state secondary battery of the embodiment of the present invention including this solid electrolyte layer does not easily allow the occurrence of a short circuit and is capable of suppressing a decrease in battery voltage.

In recent years, development for putting all-solid state secondary batteries into practical use has been rapidly progressing, and higher performance has been required for all-solid state secondary batteries. In the configuration of all-solid state secondary batteries, a lithium metal layer can be used as the negative electrode active material layer, and improvement in battery capacity can be expected. In addition, in the case of thinning the solid electrolyte layer or the like, an increase in energy density can be expected particularly in a case in which all-solid state secondary batteries are laminated in series. However, in a case in which a lithium metal layer is applied as the negative electrode active material layer, a high energy density is exhibited, but the generation and growth of lithium dendrites are significant, and there is an intrinsic problem of the likelihood of a short circuit. In addition, in the case of thinning the solid electrolyte layer or the like, the energy density can be increased; however, as expected, there is a problem of the likelihood of a short circuit.

However, in the all-solid state secondary battery of the embodiment of the present invention, as described above, it is possible to block the growth of dendrites by the solid electrolyte layer, and it is possible to solve the problem intrinsic to the lithium metal layer. Therefore, in the all-solid state secondary battery of the embodiment of the present invention including the solid electrolyte layer, it is possible to apply even a lithium metal layer having the above-described intrinsic problem as the negative electrode active material layer. That is, the all-solid state secondary battery of the embodiment of the present invention is capable of employing an aspect in which a solid electrolyte layer having the above-described specific composition and a lithium metal layer as the negative electrode active material layer (negative electrode) are combined together.

In the present invention, the lithium metal layer refers to a layer of lithium metal, and specific examples thereof include a layer obtained by stacking or shaping lithium powder, a lithium foil, a lithium-deposited film, and the like. The thickness of the lithium metal layer is not particularly limited and can be set to, for example, 1 to 500 µm.

In the all-solid state secondary battery of the embodiment of the present invention, it is possible to block the growth of dendrites by the acid-modified cellulose nanofiber (B) in the solid electrolyte layer, and the thickness of the solid electrolyte layer does not have a significant influence on the prevention of the occurrence of a short circuit. Therefore, in the all-solid state secondary battery of the embodiment of the present invention including the solid electrolyte layer containing the acid-modified cellulose nanofiber (B), it is possible to apply a thinned solid electrolyte layer. That is, the all-solid state secondary battery of the embodiment of the present invention is capable of employing an aspect in which a solid electrolyte layer having the above-described specific composition and a thinned solid electrolyte layer are combined together (or a thinned solid electrolyte layer having the above-described specific composition).

Here, the thinned solid electrolyte layer is not particularly limited as long as the solid electrolyte layer has a thickness set to be thinner than a thickness that is generally employed which will be described below. The thickness of the thinned solid electrolyte layer is, for example, preferably 30 µm or less, more preferably 1 to 30 µm, and still more preferably 1 to 20 µm.

Furthermore, the all-solid state secondary battery of the embodiment of the present invention is also capable of employing an aspect in which a solid electrolyte layer having the above-described specific composition, a thinned solid electrolyte layer, and a lithium metal layer as the negative electrode active material layer (negative electrode) are combined together.

(Positive Electrode Active Material Layer, Solid Electrolyte Layer, and Negative Electrode Active Material Layer)

In the all-solid state secondary battery of the embodiment of the present invention, as described above, the solid electrolyte layer is preferably formed of the solid electrolyte composition of the embodiment of the present invention or the solid electrolyte-containing sheet of the embodiment of the present invention. Preferably, unless particularly otherwise described, the respective components contained in the solid electrolyte layer and the contents thereof are identical to those in the solid electrolyte composition or the solid electrolyte-containing sheet. The solid electrolyte layer, generally, does not include any positive electrode active material and/or any negative electrode active material.

The positive electrode active material layer and the negative electrode active material layer may be formed of the solid electrolyte composition or the solid electrolyte-containing sheet of the embodiment of the present invention or may be formed of a solid electrolyte composition or a solid electrolyte-containing sheet that is generally used. From the viewpoint of strength or the like, both the positive electrode active material layer and the negative electrode active material layer are preferably formed of the solid electrolyte composition or the solid electrolyte-containing sheet of the embodiment of the present invention. As the solid electrolyte composition that is generally used, for example, solid electrolyte compositions containing, among the above-described components, a component other than the acid-modified cellulose nanofiber (B) are exemplified. Preferably, unless particularly otherwise described, the respective components contained in the positive electrode active material layer and the negative electrode active material layer and the contents thereof are identical to those in the solid electrolyte composition or the solid electrolyte-containing sheet.

The thicknesses of the negative electrode active material layer, the solid electrolyte layer, and the positive electrode active material layer are not particularly limited respectively. In a case in which the dimensions of ordinary all-solid state secondary batteries are taken into account, the thicknesses of the respective layers are preferably 10 to 1,000 µm and more preferably 20 µm or more and less than 500 µm. In the all-solid state secondary battery of the embodiment of the present invention, the thickness of at least one layer of the positive electrode active material layer or the negative electrode active material layer is still more preferably 50 µm or more and less than 500 µm.

Each of the positive electrode active material layer and the negative electrode active material layer may include a collector on a side opposite to the solid electrolyte layer.

(Chassis)

Depending on uses, the all-solid state secondary battery of the embodiment of the present invention may be used as an all-solid state secondary battery with the above-described structure, but the all-solid state secondary battery is preferably used by being further sealed in an appropriate chassis in order to provide a dry-cell form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

Hereinafter, the all-solid state secondary battery of the preferred embodiments of the present invention will be described with reference to FIG. 1, but the present invention is not limited thereto.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated on the negative electrode side return to the positive electrode, and electrons are supplied to an operation portion 6. In an example illustrated in the drawing, an electric bulb is employed as the operation portion 6 and is lit by discharging.

A solid electrolyte composition of the embodiment of the present invention can be preferably used as a material used to form the negative electrode active material layer, the positive electrode active material layer, and the solid electrolyte layer. In addition, a solid electrolyte-containing sheet of the embodiment of the present invention is preferred as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

In a case in which the all-solid state secondary battery having a layer constitution shown in FIG. 1 is put into a 2032-type coin case, this all-solid state secondary battery will be referred to as the electrode sheet for an all-solid state secondary battery, and a battery produced by putting this electrode sheet for an all-solid state secondary battery into a 2032-type coin case will be referred to as the all-solid state secondary battery, thereby referring to both batteries distinctively in some cases.

(Positive Electrode Active Material Layer, Solid Electrolyte Layer, and Negative Electrode Active Material Layer)

In the all-solid state secondary battery 10, at least the solid electrolyte layer 3 is formed using the solid electrolyte composition of the embodiment of the present invention or the solid electrolyte-containing sheet of the embodiment of the present invention. That is, the solid electrolyte layer contains the inorganic solid electrolyte (A) and the acid-modified cellulose nanofiber (B). In the solid electrolyte layer, the acid-modified cellulose nanofibers (B) form the cellulose porous fiber film, and a complex in which this cellulose porous fiber film is incorporated (into voids or interfaces) between the solid electrolyte (A) portions is formed. Therefore, the all-solid state secondary battery exhibits excellent battery characteristics such as not easily allowing the occurrence of a short circuit and being capable of suppressing a decrease in battery voltage for a long period of time. The reason therefor is not yet clear, but is considered as follows: The cellulose porous fiber film of the acid-modified cellulose nanofibers (B) is densely porous (non-woven fabric-like), and thus it is possible to block dendrites that have grown along the voids or interfaces, thereby suppressing additional growth (the dendrites penetrating through the cellulose porous fiber film and reaching the positive electrode). On the other hand, this densely porous property does not impair the migration of electrons and lithium ions. In addition, this cellulose porous fiber film fills the voids between the solid particles or bond the interfaces, whereby the adhesiveness between the solid particles can be reinforced. Therefore, it is considered that the occurrence of a short circuit and a decrease in battery voltage can be suppressed.

The all-solid state secondary battery of the embodiment of the present invention contains the acid-modified cellulose nanofiber (B) in the solid electrolyte layer. Therefore, it is possible to more effectively suppress the occurrence of a short circuit and a decrease in battery voltage against all-solid state secondary batteries including a solid electrolyte layer containing only non-modified cellulose nanofibers.

In a case in which the positive electrode active material layer 4 and/or the negative electrode active material layer 2 are formed of the solid electrolyte composition of the embodiment of the present invention or the solid electrolyte-containing sheet of the embodiment of the present invention, the positive electrode active material layer 4 and/or the negative electrode active material layer 2 respectively contain a positive electrode active material or a negative electrode active material, the inorganic solid electrolyte (A) and the acid-modified cellulose nanofiber (B). Therefore, the all-solid state secondary battery exhibits excellent battery characteristics for a long period of time.

The kinds of individual components that the positive electrode active material layer 4, the solid electrolyte layer 3, and the negative electrode active material layer 2 may be identical to or different from each other.

In the all-solid state secondary battery 10, it is possible to form a lithium metal layer as the negative electrode active material layer, and, it is also possible to form a thin layer as the solid electrolyte layer.

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

[Method for Manufacturing All-Solid State Secondary Battery]

The all-solid state secondary battery can be manufactured using an ordinary method. Specifically, the all-solid state secondary battery can be manufactured by forming the respective layers described above using the solid electrolyte composition of the embodiment of the present invention or the like. Therefore, it is possible to manufacture an all-solid state secondary battery stably exhibiting the above-described battery characteristics for a long period of time. Hereinafter, the manufacturing method will be described in detail.

The all-solid state secondary battery of the embodiment of the present invention can be manufactured using a method (the method for manufacturing a solid electrolyte-containing sheet of the embodiment of the present invention) including (through) a step of applying the solid electrolyte composition of the embodiment of the present invention onto a base material (for example, a metal foil that serves as a collector) and forming a coated film (forming a film).

For example, a solid electrolyte composition containing a positive electrode active material is applied as a composition for a positive electrode onto a metal foil which is a positive electrode collector so as to form a positive electrode active material layer, thereby producing a positive electrode sheet for an all-solid state secondary battery. Next, a solid electrolyte composition of the embodiment of the present invention for forming a solid electrolyte layer is applied onto the positive electrode active material layer so as to form a solid electrolyte layer. Furthermore, a solid electrolyte composition containing a negative electrode active material is applied as a material for a composition for a negative electrode onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. It is also possible to produce a desired all-solid state secondary battery by appropriately sealing the above-described laminate in a chassis.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a composition for a negative electrode onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte-containing sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte-containing sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

In the respective manufacturing methods described above, the solid electrolyte composition used to form the negative electrode active material layer and the positive electrode active material layer is not particularly limited, and examples thereof include the solid electrolyte composition of the embodiment of the present invention, solid electrolyte compositions that are ordinarily used, and the like. Examples of the solid electrolyte compositions that are ordinarily used include solid electrolyte compositions containing, among the above-described components, the components other than the acid-modified cellulose nanofiber (B).

<Formation of Individual Layers (Film Formation)>

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case in which the compositions are heated in the above-described temperature range, it is possible to remove the non-aqueous dispersion medium and form a solid state (applied and dried layer). In addition, the temperature is not excessively increased, and the respective members of the all-solid state secondary battery are not impaired, which is preferable. Therefore, in the all-solid state secondary battery, excellent total performance is exhibited, and it is possible to obtain a favorable binding property.

In a case in which the solid electrolyte composition being used is applied and dried as described above, as described above, the porous fiber film of the acid-modified cellulose nanofiber (B) and, furthermore, the complex are formed in the applied and dried layer.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The pressure is not particularly limited, but is, generally, preferably in a range of 50 to 1,500 μMPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which a coating solvent or the non-aqueous dispersion medium has been dried in advance or in a state in which a coating solvent or the non-aqueous dispersion medium remains.

The respective compositions may be applied at the same time, and the application, the drying, and the pressing may be carried out simultaneously and/or sequentially. The respective compositions may be applied to separate base materials and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the solid electrolyte-containing sheet, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the same portion with a pressure that varies stepwise.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-Solid State Secondary Battery]

The all-solid state secondary battery of the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described. In addition, "-" used in tables indicates that the corresponding example does not contain a specific component or the corresponding numerical value is zero or incomputable.

<Synthesis of Sulfide-Based Inorganic Solid Electrolyte: Li—P—S-based Glass>

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, injected into an agate mortar, and mixed using an agate muddler for five minutes. The mixing ratio between $Li_2S$ and $P_2S_5$ ($Li_2S:P_2S_5$) was set to 75:25 in terms of molar ratio.

Sixty six zirconia beads having a diameter of 5 mm were injected into a 45 mL zirconia container (manufactured by Fritsch Japan Co., Ltd.), the full amount of the mixture of the lithium sulfide and the diphosphoruspentasulfide was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, and a yellow powder (6.20 g) of a sulfide-based inorganic solid electrolyte (Li—P—S-based glass) was obtained. The ion conductivity was 0.28 mS/cm.

<Production of Acid-Modified Cellulose Nanofiber>

(Production of acid-modified CNF by oxidation of TEMPO) Microfibrous cellulose (trade name: CELISH KY100G, manufactured by Daicel FineChem Ltd.) (100 parts by mass) (water dispersion having a concentration of 10% by mass) was added to an aqueous solution (720 parts by mass) to which 2,2,6,6,-tetramethyl-1-piperidinyloxy (TEMPO, manufactured by Sigma Aldrich Japan K.K.) (1.6 parts by mass) and sodium bromide (1.0 part by mass) were added and stirred until the cellulose fibers were uniformly dispersed. Next, a sodium hypochlorite aqueous solution (amount of effective chlorine: 5 w/v %) (185 parts by mass) was added thereto, thereby initiating an oxidation reaction.

The reaction was continued for a time (reaction time X) shown in Table 1, and then oxidized powder cellulose was separated by centrifugal operation (6,000 rpm, 30 minutes, 20° C.) and sufficiently washed with water, thereby obtaining oxidation-treated powder cellulose. A 1% by mass slurry of the oxidation-treated powder cellulose was treated for 15 minutes at 12,000 rpm using a mixer, furthermore, the powder cellulose slurry was treated at a pressure of 140 MPa using an ultrahigh-pressure homogenizer (model number: NLM100, trade name: NanoDisperser, manufactured by Il Shin Autoclave Co., Ltd.) the number of times (the number of times of the treatment Y) shown in Table 1, thereby obtaining transparent gel-form dispersion liquids containing acid-modified cellulose nanofibers by TEMPO oxidation (also referred to as TEMPO-oxidized cellulose nanofibers) CNF-1 to CNF-5. The obtained TEMPO-oxidized cellulose nanofiber was a cellulose nanofiber in which a carbon atom having a hydroxyl group at the sixth site in the glucose skeleton of a microfibril was modified to a sodium salt of a carboxy group (the degrees of substitution by an acid in the TEMPO-oxidized cellulose nanofibers CNF-1 to CNF-5 were all 0.5.). For the respective TEMPO-oxidized cellulose nanofibers, the acid value, the average fiber length, and the average fiber diameter were measured using the following methods, and the results are shown in Table 1.

—Measurement of Acid Value—

The amount of an acid group contained in the cellulose nanofiber was computed using the following method.

The acid-modified cellulose nanofiber (0.2 g in terms of dried mass) was added to ion exchange water (80 mL) using a beaker. A 0.01 M sodium chloride aqueous solution (5 mL) was added thereto, and the pH was adjusted to 2.8 overall by adding 0.1 M hydrochloric acid thereto under stirring. A 0.1 M sodium hydroxide aqueous solution was injected thereinto at 0.05 mL/30 seconds using an automatic titration device (AUT-701 (trade name), manufactured by DKK-TOA Corporation), the electric conductivity and the pH value were measured every 30 seconds, and the measurement was continued until the pH reached 11. The amount of sodium hydroxide titrated was obtained from the obtained electric conductivity curve, and the amount of the acid group contained (acid value: mmol/g) was computed.

—Measurement of Average Fiber Length and Average Fiber Diameter—

The average fiber diameter of the acid-modified cellulose nanofibers refers to a value measured as described below.

A slurry containing the acid-modified cellulose nanofiber (hereinafter, referred to as the fibers in the present measurement method) was prepared, and this slurry was cast on a hydrophilized carbon film-coated grid and used as a specimen for transmission electron microscope (TEM) observation. In the case of including fibers having a large diameter, a scanning electron microscope (SEM) image of a surface cast on glass may be observed.

Electron microscope images were observed at any magnification of 1,000 times, 5,000 times, 10,000 times, 20,000 times, 50,000 times, and 100,000 times depending on the size of the configuring fiber. Here, the specimen, observation conditions, or the magnification were adjusted so as to satisfy the following conditions.

(1) A straight line X is drawn at a random place in the observation image, and 20 or more fibers intersect this straight line X.

(2) A straight line Y perpendicularly intersecting the straight line X is drawn in the same image, and 20 or more fibers intersect this straight line Y.

For each of the fibers interlocking with the straight line X and the fibers interlocking with the straight line Y in an electron microscopic observation image as described above, the widths (the short diameters of the fibers) of at least 20 fibers (that is, the total was at least 40) were read. At least three sets of electron microscope images as described above were observed as described above, and the fiber diameters of at least 40 fibers times three sets (that is, at least 120 fibers) were read.

The fiber diameters read as described above were averaged, thereby obtaining the average fiber diameter of the acid-modified cellulose nanofibers.

The average fiber length of the acid-modified cellulose nanofibers refers to a value measured as described below.

That is, the fiber length of the acid-modified cellulose nanofiber could be obtained by analyzing the electron microscopic observation images used to measure the above-described average fiber diameter.

Specifically, for each of the fibers interlocking with the straight line X and the fibers interlocking with the straight line Y in an electron microscopic observation image as described above, the fiber lengths of at least 20 fibers (that is, the total was at least 40) were read.

At least three sets of electron microscope images as described above were observed as described above, and the fiber lengths of at least 40 fibers times three sets (that is, at least 120 fibers) were read.

The fiber lengths read as described above were averaged, thereby obtaining the average fiber length of the acid-modified cellulose nanofibers.

—Computation of Aspect Ratio—

Aspect ratios (average fiber length/average fiber diameter) were computed from the obtained average fiber lengths and average fiber diameters and are shown in Table 1.

TABLE 1

| Acid-modified cellulose nanofiber | Reaction time X (hours) | Number of times of treatment (times) | Average fiber length (nm) | Average fiber diameter (nm) | Aspect ratio | Acid value (mmol/g) |
|---|---|---|---|---|---|---|
| CNF-1 | 2 | 1 | 3,500 | 300 | 11.7 | 0.24 |
| CNF-2 | 4 | 2 | 900 | 40 | 22.5 | 0.56 |
| CNF-3 | 4 | 5 | 800 | 20 | 40 | 0.59 |
| CNF-4 | 8 | 2 | 1,200 | 10 | 120 | 1.32 |
| CNF-5 | 8 | 5 | 900 | 5 | 180 | 1.45 |

(Production of Phosphoric-Acid-Esterified CNF)

Urea (3 g), sodium dihydrogenphosphatedihydrate (1.66 g), and sodium dihydrogenphosphate (1.24 g) were dissolved in water (3.3 g), thereby preparing a phosphorylation reagent A. The phosphorylation reagent A was evenly blown to microfibrous cellulose (trade name: CELISH KY100G, manufactured by Daicel FineChem Ltd.) (100 parts by mass) (water dispersion having a concentration of 10% by mass) using a sprayer and kneaded together by hands. The phosphorylation reagent and the microfibrous cellulose were put into a convection oven heated to 140° C. and stored for 60 minutes, thereby causing a phosphorylation reaction.

The reaction was continued for a time (reaction time X) shown in Table 2, and then oxidized powder cellulose was separated by centrifugal operation (6,000 rpm, 30 minutes, 20° C.) and sufficiently washed with water, thereby obtaining oxidation-treated powder cellulose. A 1% by mass slurry of the oxidation-treated powder cellulose was treated for 15 minutes at 12,000 rpm using a mixer, furthermore, the powder cellulose slurry was treated at a pressure of 140 MPa using an ultrahigh-pressure homogenizer the number of times (the number of times of the treatment Y) shown in Table 1, thereby obtaining transparent gel-form dispersion liquids containing phosphoric acid-modified cellulose nanofiber (CNF-6 to CNF-9). The phosphoric acid-modified cellulose nanofiber was a cellulose nanofiber in which hydroxyl groups at the second site, the third site, and the sixth site in the glucose skeleton of a microfibril were modified to a phosphoric acid group (—OP(=O)(OH)$_2$) (the degrees of substitution by phosphoric acid in the phosphoric acid-modified cellulose nanofibers CNF-6 to CNF-9 were all 1.5.). For the respective phosphoric acid-modified cellulose nanofibers, the acid value, the average fiber length, the average fiber diameter, and the aspect ratio were measured or computed using the above-described methods, and the results are shown in Table 2.

(Preparation of Non-Aqueous Solvent Dispersions of Acid-Modified Cellulose Nanofibers (Solvent Substitution Method))

—Preparation of Non-Aqueous Solvent Dispersion B-1—

0.1 N hydrochloric acid was slowly added to a water dispersion liquid (30 g) of the TEMPO-oxidized cellulose nanofibers CNF-1 obtained above under stirring, and a gel-form substance was precipitated when the pH reached 5.0. This gel-form substance was sedimented using a centrifugal separator (20000 G, for 10 minutes), and a supernatant was substituted with pure water, and dispersed for one minute using an ultrasonic homogenizer (model number: NLM100, trade name: NanoDisperser, manufactured by 11 Shin Autoclave Co., Ltd.). These centrifugal sedimentation, pure water substitution, and dispersion treatment were regarded as one cycle, and this cycle was carried out five times.

Next, the centrifugally sedimented supernatant was substituted with ethanol and dispersed using the above-described ultrasonic homogenizer under the same conditions for one minute. These centrifugal sedimentation, pure water substitution, and dispersion treatment were regarded as one cycle, and this cycle was carried out five times, thereby obtaining an ethanol dispersion CNF-1 of the TEMPO-oxidized cellulose nanofibers.

The obtained ethanol dispersion CNF-1 was centrifugally sedimented, and a supernatant was substituted with heptane and dispersed using the above-described ultrasonic homogenizer under the same conditions for one minute. These centrifugal sedimentation, pure water substitution, and dispersion treatment were regarded as one cycle, and this cycle was carried out five times, thereby obtaining a heptane dispersion CNF-1 of the TEMPO-oxidized cellulose nanofibers.

As a dispersant, 10% by mass, with respect to the TEMPO-oxidized cellulose nanofibers, of a polydimethylaminoethyl methacrylate-dodecyl methacrylate (20 mol/80 mol) copolymer was added thereto and dispersed using the above-described ultrasonic homogenizer under the same conditions for one minute, thereby obtaining a non-aqueous solvent (heptane) dispersion B-1 of the TEMPO-oxidized cellulose nanofibers.

TABLE 2

| Acid-modified cellulose nanofiber | Reaction time X (hours) | Number of times of treatment (times) | Average fiber length (nm) | Average fiber diameter (nm) | Aspect ratio | Acid value (mmol/g) |
|---|---|---|---|---|---|---|
| CNF-6 | 1 | 1 | 1,400 | 80 | 17.5 | 0.33 |
| CNF-7 | 0.5 | 2 | 1,200 | 90 | 13.3 | 0.15 |
| CNF-8 | 1 | 5 | 900 | 5 | 180 | 0.59 |
| CNF-9 | 2 | 2 | 800 | 10 | 80 | 1.23 |

The concentration of the obtained non-aqueous solvent dispersion of the TEMPO-oxidized cellulose nanofibers was 1% by mass, and the water content measured using the following measurement method was 30 ppm.

(Measurement of Water Content) The obtained non-aqueous solvent dispersion B-1 was filtered using a 0.02 μm membrane filter, and a water content was determined using Karl Fischer titration. The results are shown in Table 1.

—Preparation of Non-Aqueous Solvent Dispersions B-2 to B-12—

Non-aqueous solvent dispersions B-2 to B-12 of the acid-modified cellulose nanofibers were respectively prepared in the same manner as in the preparation of the non-aqueous solvent dispersion B-1 except for the fact that, in the preparation of the non-aqueous solvent dispersion B-1, the kind of the acid-modified cellulose nanofibers, the kind of the dispersant, whether or not the dispersant was used, and, furthermore, the non-aqueous dispersion media were changed as shown in Table 3.

Fritsch Japan Co., Ltd.), an oxide-based inorganic solid electrolyte LLZ (manufactured by Toshima Manufacturing Co., Ltd.) (1.5 g) and a binder D-1 (0.02 g) were added thereto, and heptane (2.5 g) was injected thereinto as a non-aqueous dispersion medium. After that, the container was set in a planetary ball mill P-7 (trade name) manufactured by Fritsch Japan Co., Ltd., and the components were continuously mixed together for 2 hours at a temperature of 25° C. and a rotation speed of 300 rpm. Next, a non-aqueous solvent dispersion B-1 of acid-modified cellulose nanofibers (1.0 g) was added thereto and mixed at a rotation speed of 100 rpm for 10 minutes, thereby preparing a solid electrolyte composition S-1.

TABLE 3

| Non-aqueous solvent dispersion of acid-modified CNFs | Acid-modified CNFs | | | | | | Dispersant of acid-modified CNFs | Non-aqueous dispersion medium | Water content (ppm) |
|---|---|---|---|---|---|---|---|---|---|
| | No. | Average fiber length (nm) | Average fiber diameter (nm) | Acid group | Acid value (mmol/g) | Solid content (% by mass) | | | |
| B-1 | CNF-1 | 3,500 | 300 | COONa | 0.24 | 1 | BS-1 | Heptane | 30 |
| B-2 | CNF-1 | 3,500 | 300 | COONa | 0.24 | 1 | — | Octane | 35 |
| B-3 | CNF-2 | 900 | 40 | COONa | 0.56 | 1 | — | Toluene | 25 |
| B-4 | CNF-2 | 900 | 40 | COONa | 0.56 | 1 | BS-2 | Isobutyl isobutyrate | 40 |
| B-5 | CNF-3 | 800 | 20 | COONa | 0.59 | 1 | BS-3 | Diisopropyl ketone | 40 |
| B-6 | CNF-3 | 800 | 20 | COONa | 0.59 | 1 | — | Cyclooctane | 20 |
| B-7 | CNF-4 | 1,200 | 10 | COONa | 1.32 | 1 | BS-4 | Cyclooctane | 20 |
| B-8 | CNF-5 | 900 | 5 | COONa | 1.45 | 1 | BS-5 | Cyclooctane/diisopropyl ketone (9/1) | 20 |
| B-9 | CNF-6 | 1,400 | 80 | Phosphoric acid group | 0.33 | 1 | BS-1 | Octane | 45 |
| B-10 | CNF-7 | 1,200 | 90 | Phosphoric acid group | 0.15 | 1 | — | Isobutyl isobutyrate | 45 |
| B-11 | CNF-8 | 900 | 5 | Phosphoric acid group | 0.59 | 1 | — | Diisopropyl ketone | 40 |
| B-12 | CNF-9 | 800 | 10 | Phosphoric acid group | 1.23 | 1 | BS-1 | Cyclooctane/diisopropyl ketone (9/1) | 40 |

<Notes of table>
BS-1: A polydimethylaminoethyl methacrylate-dodecyl methacrylate copolymer (copolymerization ratio: 20 mol/80 mol, functional group capable of interacting with acid group of CNF: tertiary amino group, Mw: 25,000)
BS-2: A polydimethylaminoethyl methacrylate-monomethoxy polyethylene glycol methacrylate copolymer (copolymerization ratio: 20 mol/80 mol, a functional group capable of interacting with acid group of CNF: tertiary amino group, Mw: 15,000)
BS-3: A stearic acid-modified substance of polyethyleneimine (functional group capable of interacting with acid group of CNF: secondary amino group (—NH group), Mw: 15,000)
BS-4: Dodecylamine (functional group capable of interacting with acid group of CNF: primary amino group)
BS-5: Hydrogenated polyisoprene terminal diol (trade name: EPOL, manufactured by Idemitsu Kosan Co., Ltd., a functional group capable of interacting with acid group of CNF: none, Mw: 2,500)

The weight-average molecular weights of the binders are values measured using the measurement method described in the description of the binder (D).

Example 1

In Example 1, solid electrolyte-containing sheets were prepared, and, regarding these sheets, the binding property and the bending resistance were evaluated.

<Preparation of Solid Electrolyte Compositions>
—Preparation of Solid Electrolyte Composition S-1—

Fifty zirconia beads having a diameter of 3 mm were injected into a 45 mL zirconia container (manufactured by (2) Preparation of Solid Electrolyte Compositions S-2 to S-17 and HS-1 to HS-3

Solid electrolyte compositions S-2 to S-17 and HS-1 to HS-3 were respectively prepared in the same manner as the solid electrolyte composition S-1 except for the fact that, in the Preparation of the solid electrolyte composition S-1, the composition was changed as shown in Table 1.

The results of the water content in each of the obtained solid electrolyte compositions measured using the above-described method (in the same manner as in the method for measuring the water content in the non-aqueous solvent dispersion) are shown in Table 4.

TABLE 4

| Solid electrolyte composition | Solid electrolyte (A) | | Dispersion of acid-modified CNFs | | Binder (D) | | Mass ratio of contents (A)/(B) | Non-aqueous dispersion medium (C) | | Water content (ppm) |
|---|---|---|---|---|---|---|---|---|---|---|
| | Kind | Content | Kind | Content | Kind | Content | | Kind | Content | |
| S-1 | LLZ | 1.5 | B-1 | 1.0 | D-1 | 0.02 | 99.3/0.7 | Heptane | 2.5 | 50 |
| S-2 | Li—P—S | 1.5 | B-1 | 1.0 | D-1 | 0.02 | 99.3/0.7 | Heptane | 2.5 | 30 |
| S-3 | Li—P—S | 1.5 | B-2 | 2.0 | — | — | 98.7/1.3 | Heptane | 2.5 | 35 |
| S-4 | Li—P—S | 1.5 | B-3 | 2.0 | D-2 | 0.02 | 98.7/1.3 | Octane | 2.5 | 35 |
| S-5 | Li—P—S | 1.5 | B-4 | 1.0 | — | — | 99.3/0.7 | Isobutyl isobutyrate | 2.5 | 40 |
| S-6 | Li—P—S | 1.5 | B-5 | 2.0 | D-3 | 0.02 | 98.7/1.3 | Diisopropyl ketone | 2.5 | 30 |

TABLE 4-continued

| Solid electrolyte composition | Solid electrolyte (A) Kind | Content | Dispersion of acid-modified CNFs Kind | Content | Binder (D) Kind | Content | Mass ratio of contents (A)/(B) | Non-aqueous dispersion medium (C) Kind | Content | Water content (ppm) |
|---|---|---|---|---|---|---|---|---|---|---|
| S-7 | Li—P—S | 1.5 | B-6 | 4.0 | D-4 | 0.02 | 97.4/2.6 | Cyclooctane | 2.5 | 30 |
| S-8 | Li—P—S | 1.5 | B-7 | 4.0 | D-4 | 0.02 | 97.4/2.6 | Cyclooctane | 2.5 | 20 |
| S-9 | Li—P—S | 1.5 | B-8 | 4.0 | D-5 | 0.02 | 97.4/2.6 | Cyclooctane/diisopropyl ketone (9/1) | 2.5 | 25 |
| S-10 | Li—P—S | 1.5 | B-9 | 4.0 | — | — | 97.4/2.6 | Octane | 2.5 | 25 |
| S-11 | Li—P—S | 1.5 | B-10 | 4.0 | D-5 | 0.02 | 97.4/2.6 | Isobutyl isobutyrate | 2.5 | 45 |
| S-12 | Li—P—S | 1.5 | B-11 | 4.0 | D-5 | 0.02 | 97.4/2.6 | Diisopropyl ketone | 2.5 | 30 |
| S-13 | Li—P—S | 1.5 | B-12 | 4.0 | D-5 | 0.02 | 97.4/2.6 | Cyclooctane/diisopropyl ketone (9/1) | 2.5 | 40 |
| S-14 | Li—P—S | 1.5 | B-1 | 1.0 | D-5 | 0.02 | 99.3/0.7 | Octane/isobuylisobutyrate (8/2) | 2.5 | 50 |
| S-15 | Li—P—S | 1.5 | B-2 | 4.0 | D-5 | 0.02 | 97.4/2.6 | Octane/butyl butyrate (8/2) | 2.5 | 30 |
| S-16 | Li—P—S | 1.5 | B-8 | 20.0 | D-5 | 0.01 | 88.2/11.8 | Cyclooctane/diisopropyl ketone (9/1) | 2.5 | 25 |
| S-17 | Li—P—S | 1.5 | B-8 | 50.0 | D-5 | 0.005 | 75/25 | Cyclooctane/diisopropyl ketone (9/1) | 2.5 | 25 |
| HS-1 | LLZ | 1.5 | — | — | D-1 | 0.04 | — | Heptane | 2.5 | 10 |
| HS-2 | Li—P—S | 1.5 | — | — | D-1 | 0.04 | — | Heptane | 2.5 | 10 |
| HS-3 | Li—P—S | 1.5 | B-1N | 2.0 | D-1 | 0.04 | 98.7/1.3 | Heptane | 2.5 | 30 |

<Notes of table>
All of the contents indicate the amount mixed, and the unit thereof is 'parts by mass'.
LLZ: $Li_7La_3Zr_2O_{12}$ (manufactured by Toshima Manufacturing Co., Ltd.)
Li—P—S: Li—P—S-based glass synthesized above
B-1N: Non-acid-modified mechanically dispersed cellulose nanofibers (manufactured by Sugino Machine Limited, average fiber diameter: 20 nm, average fiber length: 800 nm)
D-1: Polyvinylene difluoride-hexafluoropropylene (PVdF-HFP, basic functional group: none, manufactured by Arkema S.A.)
D-2: Styrene butadiene rubber (SBR, basic functional group: none, manufactured by JSR Corporation),
D-3: An acrylic acid-methyl acrylate copolymer prepared using the following method (copolymerization ratio: 20 mol/80 molar ratio, basic functional group: none, Mw by the above-described measurement method: 25,000)
D-4: Acrylic latex (binder (B-1) described in JP2015-088486A, basic functional group: none, latex average particle diameter: 500 nm (the average particle diameter was measured using the above-described method.))
D-5: A urethane polymer (exemplary compound (34) described in JP2015-088480A, basic functional group: none)

—Preparation of Binder D-3—

Acrylic acid (manufactured by Wako Pure Chemical Industries, Ltd.) (1.2 g) and methyl acrylate (4.2 g) (manufactured by Wako Pure Chemical Industries, Ltd.) were injected into a 100 mL three-neck flask, dissolved in methyl ethyl ketone (MEK) (30 g), and substituted with nitrogen while being heated to 75° C. Azoisobutyronitrile (V-60: trade name, manufactured by Wako Pure Chemical Industries, Ltd.) (0.15 g) was added thereto and heated at 75° C. for six hours in a nitrogen atmosphere. The obtained polymer solution was polymer-precipitated using hexane. The obtained precipitate was filtered and dried, thereby obtaining a white powder of a binder D-3.

<Production of Solid Electrolyte-Containing Sheets SS-1 to SS-17 and HSS-1 to HSS-3>

The prepared inorganic solid electrolyte composition S-1 was applied onto a peeling sheet (manufactured by Lintech Corporation, film thickness: 30 μm) using an applicator having a clearance set to 100 μm and dried on a hot plate at 80° C. for 20 minutes (to remove the non-aqueous dispersion medium). A solid electrolyte-containing sheet SS-1 having a 30 μm-thick solid electrolyte layer was produced as described above.

Solid electrolyte-containing sheets SS-2 to SS-17 and HSS-1 to HSS-3 were respectively produced in the same manner as in the production of the inorganic solid electrolyte composition S-1 except for the fact that, in the production of the solid electrolyte-containing sheet SS-1, inorganic solid electrolyte compositions shown in Table 5 were used instead of the inorganic solid electrolyte composition S-1 and the thickness was adjusted to the value shown in Table 5.

<Evaluation 2: Evaluation of Binding Property>

The binding property of each of the obtained solid electrolyte-containing sheets was evaluated by a 180° C. peeling test (JIS Z0237-2009). The results are shown in Table 5.

Pressure-sensitive adhesive tape (width: 24 mm, length: 300 mm, trade name: CELLOTAPE (registered trademark) CT-24, manufactured by Nichiban Co., Ltd.) was attached to the surface of the solid electrolyte layer of each solid electrolyte-containing sheet. The tape was folded back 180° by gripping an end portion of the tape and peeled off as long as 25 mm from the solid electrolyte layer. After that, a portion of the solid electrolyte-containing sheet from which the pressure-sensitive adhesive tape had been peeled off was fixed to a lower-side jig installed in the following tester, and the peeled pressure-sensitive adhesive tape was fixed to an upper-side jig.

The test was carried out at a loading rate of 300 mm/minute. A pressure-sensitive adhesive force (peeling force) when, after the initiation of measurement, the pressure-sensitive adhesive tape was peeled off from the solid electrolyte layer as long as 25 mm, and then the pressure-sensitive adhesive tape was further peeled off as long as 50 mm was measured, and the average was obtained and regarded as an average peel strength (N).

The peel strength was measured using a combination of a standard-type digital force gauge ZTS-5N and a vertical electric measurement stand MX2 series (all trade names, manufactured by IMADA Co., Ltd.).

In the present test, the binding property was determined by which of the following evaluation ranks the average peel strength belonged to. A high average peel strength indicates a strong binding force of the solid electrolyte layer. In the present test, regarding voltage, the evaluation ranks of "C" or higher are pass.

—Evaluation Ranks of Binding Property—
A: 2.0 N or more
B: 1.0 N or more and less than 2.0 N
C: 0.5 N or more and less than 1.0 N
D: 0.1 N or more and less than 0.5 N
E: Less than 0.1 N <Evaluation 3: Bending Resistance (Reference Test)>

The binding characteristic of each of the obtained solid electrolyte-containing sheets was evaluated by a bending resistance test. The results are shown in Table 5.

Each of the obtained solid electrolyte-containing sheets was wound around stainless steel (SUS) rods having different diameters after the peeling sheet was peeled off, and the presence or absence of chips, cracks, or fissures in the solid electrolyte layer and the presence or absence of the peeling sheet peeled off from the solid electrolyte layer were confirmed. The bending resistance was evaluated by which of the following evaluation ranks the minimum diameter of the rod around which the solid electrolyte-containing sheet was wound without generating abnormality such as the above-described defect belonged to. The results are shown in Table 5.

In the present invention, a small minimum diameter of the rod indicates a high resistance to bending. The bending resistance was a reference test, and the evaluation ranks of "C" or higher are preferred.

—Evaluation Ranks of Bending Resistance—
A: Less than 5 mm
B: 5 mm or more and less than 10 mm
C: 10 mm or more and less than 15 mm
D: 15 mm or more and less than 30 mm
E: 30 mm or more

TABLE 5

| Solid electrolyte-containing sheet | Solid electrolyte composition | Thickness (μm) | Binding property (peel strength) | Bending resistance |
|---|---|---|---|---|
| SS-1 | S-1 | 30 | C | C |
| SS-2 | S-2 | 30 | C | C |
| SS-3 | S-3 | 30 | C | B |
| SS-4 | S-4 | 30 | B | B |
| SS-5 | S-5 | 30 | C | C |
| SS-6 | S-6 | 30 | B | A |
| SS-7 | S-7 | 30 | B | A |
| SS-8 | S-8 | 30 | B | A |
| SS-9 | S-9 | 20 | B | B |
| SS-10 | S-10 | 15 | C | A |
| SS-11 | S-11 | 15 | A | A |
| SS-12 | S-12 | 15 | A | A |
| SS-13 | S-13 | 15 | A | A |
| SS-14 | S-14 | 15 | A | B |
| SS-15 | S-15 | 30 | A | A |
| SS-16 | S-16 | 20 | A | B |
| SS-17 | S-17 | 20 | A | A |
| HSS-1 | HS-1 | 30 | E | E |
| HSS-2 | HS-2 | 70 | E | E |
| HSS-3 | HS-3 | 30 | D | D |

As is clear from Table 5, both the solid electrolyte-containing sheets HSS-1 and HSS-2 not containing the cellulose nanofibers were not sufficient in binding property and, furthermore, also poor in bending resistance. In addition, the solid electrolyte-containing sheet HSS-3 containing the mechanically dispersed cellulose nanofibers (not acid-modified) was also, similarly, not sufficient in binding property and bending resistance.

In contrast, all of the solid electrolyte-containing sheets SS-1 to SS-17 containing the acid-modified cellulose nanofibers exhibited a strong binding property and, furthermore, were also excellent in terms of bending resistance.

Example 2

In Example 2, positive electrode sheets for an all-solid state secondary battery were produced, and, regarding these sheets, the binding property and the bending resistance were evaluated.

<Preparation of Composition for Positive Electrode>

—Preparation of Composition for Positive Electrode P-1—

Fifty zirconia beads having a diameter of 3 mm were injected into a 45 mL zirconia container (manufactured by Fritsch Japan Co., Ltd.), and the solid electrolyte composition S-2 prepared in Example 1 (1.5 g) was added thereto. A positive electrode active material NCA (3.6 g) was added thereto, and then this container was set in a planetary ball mill P-7 (trade name, manufactured by Fritsch Japan Co., Ltd.), and the components were continuously stirred at a temperature of 25° C. and a rotation speed of 100 rpm for 10 minutes, thereby preparing a composition for a positive electrode P-1.

(2) Preparation of Compositions for Positive Electrode P-2 to P-8, HP-1, and HP-2—

Compositions for a positive electrode P-2 to P-8, HP-1, and HP-2 were respectively prepared in the same manner as the composition for a positive electrode P-1 except for the fact that, in the preparation of the composition for a positive electrode P-1, the composition was changed as shown in Table 6.

<Production of Positive Electrode Sheets for All-Solid State Secondary Battery PS-1 to PS-8, HPS-1, and HPS-2>

The prepared composition for a positive electrode P-1 was applied onto a peeling sheet (manufactured by Lintech Corporation, film thickness: 30 μm) using an applicator having a clearance set to 300 μm and dried on a hot plate at 80° C. for 20 minutes (to remove the non-aqueous dispersion medium). After that, the peeling sheet was peeled off, thereby forming a positive electrode sheet for all-solid state secondary battery PS-1 having a 100 μm-thick positive electrode active material layer.

Positive electrode sheets for all-solid state secondary battery PS-2 to PS-8, HPS-1, and HPS-2 were respectively produced in the same manner as in the production of the positive electrode sheet for an all-solid state secondary battery PS-1 except for the fact that, in the production of the positive electrode sheet for an all-solid state secondary battery PS-1, the composition for a positive electrode P-2 to P-8, HP-1, or HP-2 was used instead of the composition for a positive electrode P-1.

<Evaluation>

Regarding each of the obtained positive electrode sheets for all-solid state secondary battery PS-1 to PS-8, HPS-1, and HPS-2, the binding property and the bending resistance were evaluated in the same manner as in Example 1. The results are shown in Table 6.

TABLE 6

| Composition for positive electrode | Solid electrolyte composition | | Active material (E) | | Conductive auxiliary agent (F) | | Water content (ppm) | Electrode sheet for all-solid state secondary battery | Peel strength | Bending resistance |
|---|---|---|---|---|---|---|---|---|---|---|
| | Kind | Content | Kind | Content | Kind | Content | | | | |
| P-1 | S-2 | 1.5 | NCA | 3.6 | — | — | 30 | PS-1 | C | C |
| P-2 | S-4 | 1.5 | NCA | 3.6 | — | — | 35 | PS-2 | B | B |
| P-3 | S-7 | 1.8 | NMC | 3.6 | AB | 0.1 | 30 | PS-3 | B | A |
| P-4 | S-9 | 1.8 | NMC | 3.6 | AB | 0.1 | 25 | PS-4 | A | B |
| P-5 | S-11 | 1.8 | NMC | 3.6 | AB | 0.2 | 45 | PS-5 | A | A |
| P-6 | S-13 | 1.8 | NMC | 3.6 | AB | 0.1 | 40 | PS-6 | A | A |
| P-7 | S-14 | 1.5 | NMC | 3.6 | VGCF | 0.1 | 50 | PS-7 | A | B |
| P-8 | S-15 | 2.0 | NMC | 3.6 | AB | 0.2 | 30 | PS-8 | A | A |
| HP-1 | HS-2 | 1.5 | NCA | 3.6 | — | — | 10 | HPS-1 | E | E |
| HP-2 | HS-3 | 1.5 | NMC | 3.6 | AB | 0.1 | 30 | HPS-2 | D | D |

<Notes of table>
All of the contents indicate the amount mixed, and the unit thereof is 'parts by mass'.
NCA: $LiNi_{0.85}Co_{0.10}Al_{0.05}O_2$ (lithium nickel cobalt aluminum oxide)
NMC: $LiNi_{1/3}Co_{1/3}Mn_{1/3}O_2$ (lithium nickel manganese cobalt oxide)
AB: Acetylene black
VGCF: Gas-phase method carbon nanotube (manufactured by Showa Denko K.K.)

As is clear from Table 6, both the positive electrode sheets for an all-solid state secondary battery HPS-1 and HPS-2 not containing the acid-modified cellulose nanofibers were not sufficient in binding property and, furthermore, also poor in bending resistance.

In contrast, all of the positive electrode sheets for an all-solid state secondary battery PS-1 to PS-8 containing the acid-modified cellulose nanofibers exhibited a strong binding property and, furthermore, were also excellent in terms of bending resistance.

Example 3

In Example 3, all-solid state secondary batteries were manufactured, and battery performance (the number of cycles for the occurrence of a short circuit and a decrease in battery voltage) was evaluated.

<Production of Electrode Sheet for All-Solid State Secondary Battery Z-1>

The composition for a positive electrode P-1 prepared in Example 2 was applied onto the 30 μm-thick solid electrolyte-containing sheet SS-1 using an applicator having a clearance set to 300 μm and dried on a hot plate at 80° C. for 20 minutes (to remove the non-aqueous dispersion medium), thereby forming a positive electrode active material layer PS-1 (film thickness: 100 μm) on the solid electrolyte layer. Next, the peeling sheet of the solid electrolyte-containing sheet SS-1 was peeled off, and an exposed surface of the solid electrolyte layer and a Li metal foil (thickness: 50 μm) were brought into contact (laminated) with each other and pressed at 50 MPa. An electrode sheet for an all-solid state secondary battery Z-1 formed by laminating the positive electrode active material layer, the solid electrolyte layer, and the negative electrode layer (Li metal layer) in this order was produced as described above.

<Manufacturing of All-Solid State Secondary Battery SC-1>

Figure 2:
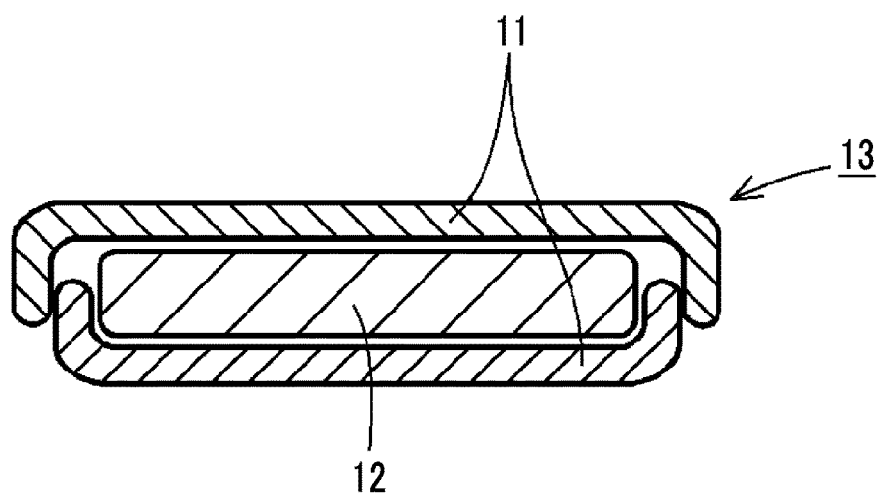
FIG. 2 is a vertical cross-sectional view schematically illustrating an all-solid state secondary battery (coin battery) produced in an example.

A disc-like piece having a diameter of 14.5 mm was cut out from the produced electrode sheet for an all-solid state secondary battery Z-1, was put into a stainless steel 2032-type coin case 11 in which a spacer and a washer (both are not illustrated in FIG. 2) were combined together as shown in FIG. 2, and was swaged with a force of eight newtons (N) using a torque wrench, thereby manufacturing an all-solid state secondary battery SC-1 having a layer constitution illustrated in FIG. 1.

<Manufacturing of All-Solid State Secondary Batteries SC-2 to SC-17 and HSC-1 to HSC-4>

Electrode sheets for an all-solid state secondary battery Z-2 to Z-17 and HZ-1 to HZ-4 were respectively produced in the same manner as in the production of the electrode sheet for an all-solid state secondary battery Z-1 except for the fact that, in the production of the electrode sheet for an all-solid state secondary battery Z-1, solid electrolyte-containing sheets, compositions for a positive electrode, and negative electrode active material layer shown in Table 7 were used instead of the solid electrolyte-containing sheet SS-1 and the composition for a positive electrode P-1.

A positive electrode active material layer PS—X shown in Table 7 indicates a layer formed of a composition for a positive electrode S—X (X represents an integer of 1 to 17). The above description is also true for positive electrode active material layers HPS-Y (Y represents an integer of 1 to 3).

Next, all-solid state secondary battery SC-2 to SC-17 and HSC-1 to HSC-4 were respectively produced in the same manner as in the manufacturing of the all-solid state secondary battery SC-1 except for the fact that, in the manufacturing of the all-solid state secondary battery SC-1, electrode sheets for an all-solid state secondary battery shown in Table 7 were used instead of the electrode sheet for an all-solid state secondary battery Z-1.

<Evaluation of Battery Bharacteristic>
—Measurement of Battery Voltage—

The battery voltage of each of the manufactured all-solid state secondary batteries was measured using a charging and discharging evaluation device manufactured by Toyo System Corporation: TOSCAT-3000 (trade name). Charging was carried out at a current density of 0.1 C until the battery voltage reached 4.2 V, and discharging was carried out at a current density of 0.2 C until the voltage reached 3.5 V.

(Dendrite Suppression Test)

The number of charging and discharging cycles carried out until a short circuit occurred in the all-solid state secondary battery was evaluated by repeating charging and discharging alternately under the above-described conditions. Regarding the charging and discharging cycle, single charging and single discharging were regarded as one cycle.

A dendrite suppression test was determined by which of the following evaluation ranks the number of charging and discharging cycles belonged to. In the present test, the evaluation ranks of "C" or higher are pass.

—Evaluation Ranks of Dendrite Suppression Test—
A: 100 cycles or more
B: 20 cycles or more and less than 100 cycles
C: 5 cycles or more and less than 20 cycles
D: 1 cycle or more and less than 5 cycles
E: Less than 1 cycle (Voltage Decrease Suppression Test)

The battery voltage was measured after the all-solid state secondary battery was charged up to 4.2 V and discharged at 5 mAh/g.

A voltage decrease suppression test was determined by which of the following evaluation ranks the battery voltage after 5 mAh/g discharging belonged to. In the present test, the evaluation ranks of "C" or higher are pass.

—Evaluation Ranks of Voltage Decrease Suppression Test—
A: 4.15 V or more
B: 4.10 V or more and less than 4.15 V
C: 4.05 V or more and less than 4.10 V
D: 4.0 V or more and less than 4.05 V
E: Less than 4.0 V a short circuit could be suppressed, and, furthermore, a decrease in battery voltage could also be suppressed. Particularly, it is found that the all-solid state secondary batteries SC-1 to SC-16 were capable of suppressing both the occurrence of a short circuit and a decrease in battery voltage in spite of the fact that the all-solid state secondary batteries included the lithium metal layer as the negative electrode active material layer and the solid electrolyte layer thinned to 15 to 30 μm. This is considered to be because the solid electrolyte layers of the solid electrolyte-containing sheets SS-1 to SS-17 exhibited a strong binding property and, furthermore, were capable of blocking dendrites from reaching the positive electrodes.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2017-189047 filed on Sep. 28, 2017 in Japan, the content of which is incorporated herein by reference.

TABLE 7

| All-solid state secondary battery | Electrode sheet for all-solid state secondary battery | Positive electrode active material layer | Solid electrolyte layer No. | Thickness (μm) | Negative electrode active material layer | Evaluation Dendrite suppression test | Voltage decrease suppression test |
|---|---|---|---|---|---|---|---|
| SC-1 | Z-1 | PS-1 | SS-1 | 30 | Li metal foil | B | B |
| SC-2 | Z-2 | PS-2 | SS-2 | 30 | Li metal foil | B | B |
| SC-3 | Z-3 | PS-3 | SS-3 | 30 | Li metal foil | B | B |
| SC-4 | Z-4 | PS-4 | SS-4 | 30 | Li metal foil | B | A |
| SC-5 | Z-5 | PS-5 | SS-5 | 30 | Li metal foil | B | A |
| SC-6 | Z-6 | PS-6 | SS-6 | 30 | Li metal foil | B | A |
| SC-7 | Z-7 | PS-7 | SS-7 | 30 | Li metal foil | B | A |
| SC-8 | Z-8 | PS-8 | SS-8 | 30 | Li metal foil | B | A |
| SC-9 | Z-9 | HPS-1 | SS-9 | 20 | Li metal foil | A | C |
| SC-10 | Z-10 | HPS-2 | SS-10 | 15 | Li metal foil | B | B |
| SC-11 | Z-11 | HPS-1 | SS-11 | 15 | Li metal foil | A | C |
| SC-12 | Z-12 | HPS-2 | SS-12 | 15 | Li metal foil | A | B |
| SC-13 | Z-13 | PS-6 | SS-13 | 15 | Li metal foil | A | A |
| SC-14 | Z-14 | PS-7 | SS-14 | 15 | Li metal foil | A | A |
| SC-15 | Z-15 | HPS-1 | SS-16 | 20 | Li metal foil | A | B |
| SC-16 | Z-16 | HPS-1 | SS-17 | 20 | Li metal foil | A | A |
| SC-17 | Z-17 | PS-1 | SS-1 | 30 | Graphite/Li—P—S (mass ratio: 60/40) | A | C |
| HSC-1 | HZ-1 | HPS-1 | HSS-1 | 30 | Li metal foil | E | E |
| HSC-2 | HZ-2 | HPS-1 | HSS-2 | 70 | Li metal foil | D | E |
| HSC-3 | HZ-3 | HPS-2 | HSS-3 | 30 | Li metal foil | D | D |
| HSC-4 | HZ-4 | PS-8 | HSS-1 | 30 | Li metal foil | D | D |

As is clear from Table 7, in both of the all-solid state secondary batteries HSC-1 and HSS-2 including the solid electrolyte layer containing the inorganic solid electrolyte but not containing the cellulose nanofibers, a short circuit occurred with a small number of cycles, and, furthermore, a decrease in battery voltage was also significant. In addition, in both of the all-solid state secondary batteries HSC-3 and HSS-4 including the solid electrolyte layer containing the mechanically dispersed cellulose nanofibers (not acid-modified) and the inorganic solid electrolyte, a short circuit occurred with a small number of cycles, and, furthermore, a decrease in battery voltage was also significant.

In contrast, in all of the all-solid state secondary batteries SC-1 and SC-17 containing the inorganic solid electrolyte (A) and the acid-modified cellulose nanofiber (B) and having the solid electrolyte layer having the complex, the growth of dendrites was blocked, whereby the occurrence of

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: electrode sheet for all-solid state secondary battery
13: all-solid state secondary battery

What is claimed is:
1. A solid electrolyte composition comprising:
an inorganic solid electrolyte (A) having conductivity of an ion of a metal belonging to Group I or II of the periodic table;

an acid-modified cellulose nanofiber (B); and
a binder (D).

2. The solid electrolyte composition according to claim 1, wherein the acid-modified cellulose nanofiber (B) is an acid-modified substance of at least any of a carboxy group or a phosphoric acid group and a salt thereof.

3. The solid electrolyte composition according to claim 1, wherein an acid value of the acid-modified cellulose nanofiber (B) is 0.1 to 2.5 mmol/g.

4. The solid electrolyte composition according to claim 1, wherein the acid-modified cellulose nanofiber (B) have an average fiber diameter of 1 to 1,000 nm and an average fiber length of 10 to 100,000 nm.

5. The solid electrolyte composition according to claim 1, wherein a mass ratio (A)/(B) of a content of the inorganic solid electrolyte (A) to a content of the acid-modified cellulose nanofiber (B) is 99.9/0.1 to 50/50.

6. The solid electrolyte composition according to claim 1, wherein a water content is 50 ppm or less.

7. The solid electrolyte composition according to claim 1, wherein the inorganic solid electrolyte (A) is a sulfide-based inorganic solid electrolyte.

8. The solid electrolyte composition according to claim 1, further comprising:
a non-aqueous dispersion medium (C).

9. The solid electrolyte composition according to claim 1, wherein the non-aqueous dispersion medium (C) is a hydrocarbon compound solvent, an ether compound solvent, a ketone compound solvent, an ester compound solvent, or a combination of two or more thereof.

10. The solid electrolyte composition according to claim 1, wherein the binder (D) includes a polymer having a basic functional group.

11. The solid electrolyte composition according to claim 1, further comprising:
an active material (E).

12. A solid electrolyte-containing sheet comprising:
an inorganic solid electrolyte (A) having conductivity of an ion of a metal belonging to Group I or II of the periodic table;
an acid-modified cellulose nanofiber (B); and
a binder (D).

13. A method for manufacturing a solid electrolyte-containing sheet comprising:
a step of forming a film of the solid electrolyte composition according to claim 1.

14. A method for manufacturing an all-solid state secondary battery,
wherein the all-solid state secondary battery is manufactured through the manufacturing method according to claim 13.

15. An all-solid state secondary battery comprising:
a positive electrode active material layer;
a negative electrode active material layer; and
an inorganic solid electrolyte layer between the positive electrode active material layer and the negative electrode active material layer,
wherein the inorganic solid electrolyte layer contains an inorganic solid electrolyte (A) having conductivity of an ion of a metal belonging to Group I or II of the periodic table, an acid-modified cellulose nanofiber (B) and a binder (D).

16. The all-solid state secondary battery according to claim 15,
wherein the inorganic solid electrolyte layer has a thickness of 1 to 30 µm.

17. The all-solid state secondary battery according to claim 15,
wherein the negative electrode active material layer is a layer of lithium metal.

18. A solid electrolyte composition comprising:
an inorganic solid electrolyte (A) having conductivity of an ion of a metal belonging to Group I or II of the periodic table;
an acid-modified cellulose nanofiber (B); and
a conductive auxiliary agent (F).

19. The solid electrolyte composition according to claim 18,
wherein the acid-modified cellulose nanofiber (B) is an acid-modified substance of at least any of a carboxy group or a phosphoric acid group and a salt thereof.

20. The solid electrolyte composition according to claim 18,
wherein an acid value of the acid-modified cellulose nanofiber (B) is 0.1 to 2.5 mol/g.

21. The solid electrolyte composition according to claim 18,
wherein the acid-modified cellulose nanofiber (B) have an average fiber diameter of 1 to 1,000 nm and an average fiber length of 10 to 100,000 nm.

22. The solid electrolyte composition according to claim 18,
wherein a mass ratio (A)/(B) of a content of the inorganic solid electrolyte (A) to a content of the acid-modified cellulose nanofiber (B) is 99.9/0.1 to 50/50.

23. The solid electrolyte composition according to claim 18,
wherein a water content is 50 ppm or less.

24. The solid electrolyte composition according to claim 18,
wherein the inorganic solid electrolyte (A) is a sulfide-based inorganic solid electrolyte.

25. The solid electrolyte composition according to claim 18, further comprising:
a non-aqueous dispersion medium (C).

26. The solid electrolyte composition according to claim 18,
wherein the non-aqueous dispersion medium (C) is a hydrocarbon compound solvent, an ether compound solvent, a ketone compound solvent, an ester compound solvent, or a combination of two or more thereof.

27. The solid electrolyte composition according to claim 18,
wherein the binder (D) includes a polymer having a basic functional group.

28. The solid electrolyte composition according to claim 18, further comprising:
an active material (E).

29. A method for manufacturing a solid electrolyte-containing sheet comprising:
a step of forming a film of the solid electrolyte composition according to claim 18.

30. A method for manufacturing an all-solid state secondary battery,
wherein the all-solid state secondary battery is manufactured through the manufacturing method according to claim 29.

31. A solid electrolyte-containing sheet comprising:
an inorganic solid electrolyte (A) having conductivity of an ion of a metal belonging to Group I or II of the periodic table;
an acid-modified cellulose nanofiber (B); and
a conductive auxiliary agent (F).

32. An all-solid state secondary battery comprising:
a positive electrode active material layer;
a negative electrode active material layer; and
an inorganic solid electrolyte layer between the positive electrode active material layer and the negative electrode active material layer,
wherein the inorganic solid electrolyte layer contains an inorganic solid electrolyte (A) having conductivity of an ion of a metal belonging to Group I or II of the periodic table, an acid-modified cellulose nanofiber (B) and a conductive auxiliary agent (F).

33. The all-solid state secondary battery according to claim 32,
wherein the inorganic solid electrolyte layer has a thickness of 1 to 30 µm.

34. The all-solid state secondary battery according to claim 32,
wherein the negative electrode active material layer is a layer of lithium metal.

* * * * *